US006785341B2

(12) United States Patent
Walton et al.

(10) Patent No.: US 6,785,341 B2
(45) Date of Patent: *Aug. 31, 2004

(54) METHOD AND APPARATUS FOR PROCESSING DATA IN A MULTIPLE-INPUT MULTIPLE-OUTPUT (MIMO) COMMUNICATION SYSTEM UTILIZING CHANNEL STATE INFORMATION

(75) Inventors: Jay R. Walton, Westford, MA (US); Mark Wallace, Bedford, MA (US); John W. Ketchum, Harvard, MA (US); Steven J. Howard, Ashland, MA (US)

(73) Assignee: Qualcomm Incorporated, San Diego, CA (US)

( * ) Notice: Subject to any disclaimer, the term of this patent is extended or adjusted under 35 U.S.C. 154(b) by 478 days.

This patent is subject to a terminal disclaimer.

(21) Appl. No.: 09/854,235

(22) Filed: May 11, 2001

(65) Prior Publication Data

US 2003/0035491 A1 Feb. 20, 2003

(51) Int. Cl.[7] .............................................. H04B 7/02
(52) U.S. Cl. ...................................... 375/267; 375/346
(58) Field of Search ................................ 375/267, 260, 375/144, 148, 346, 347

(56) References Cited

U.S. PATENT DOCUMENTS

| 5,471,647 A | 11/1995 | Gerlach et al. | |
|---|---|---|---|
| 6,131,016 A | 10/2000 | Greenstein et al. | ............ 455/69 |
| 6,141,567 A | 10/2000 | Youssefmir et al. | |
| 6,473,467 B1 * | 10/2002 | Wallace et al. | ............. 375/267 |

FOREIGN PATENT DOCUMENTS

| EP | 0951091 | 10/1999 |
|---|---|---|
| EP | 0951091 A2 | 10/1999 |
| WO | 96/22662 | 7/1996 |
| WO | 9809381 | 3/1998 |
| WO | 98/30047 | 7/1998 |

OTHER PUBLICATIONS

Jongren, et al. "Utilizing Quantized Feedback Information in Orthogonal Space–Time Block Coding" 2000 IEEE Global Telecommunications Conference 2: 995–999 (Nov. 27, 2000).
John A.C. Bingham, "Multicarrier Modulation for Data Transmission: An Idea Whose Time Has Come," IEEE Communications Magazine, May 1990 (pp. 5–13).
B. Hassibi, et al. "High–Rate Codes that are Linear in Space and Time," LUCENT Technologies, Murray Hill, NY (USA), Aug. 22, 2000, (pp. 1–54).
P.W. Wolniansky, et al. "V–BLAST: An Architecture for Realizing Very High Data Rates Over the Rich–Scattering Wireless Channel," LUCENT Technologies, Holmdel, NJ.

* cited by examiner

*Primary Examiner*—Temesghen Ghebretinsae
(74) *Attorney, Agent, or Firm*—Philip Wadsworth; Thien T. Nguyen; Thomas R. Rouse

(57) ABSTRACT

Techniques to "successively" process received signals at a receiver unit in a MIMO system to recover transmitted data, and to "adaptively" process data at a transmitter unit based on channel state information available for the MIMO channel. A successive cancellation receiver processing technique is used to process the received signals and performs a number of iterations to provide decoded data streams. For each iteration, input (e.g., received) signals for the iteration are processed to provide one or more symbol streams. One of the symbol streams is selected and processed to provide a decoded data stream. The interference due to the decoded data stream is approximately removed (i.e., canceled) from the input signals provided to the next iteration. The channel characteristics are estimated and reported back to the transmitter system and used to adjust (i.e., adapt) the processing (e.g., coding, modulation, and so on) of data prior to transmission.

57 Claims, 10 Drawing Sheets

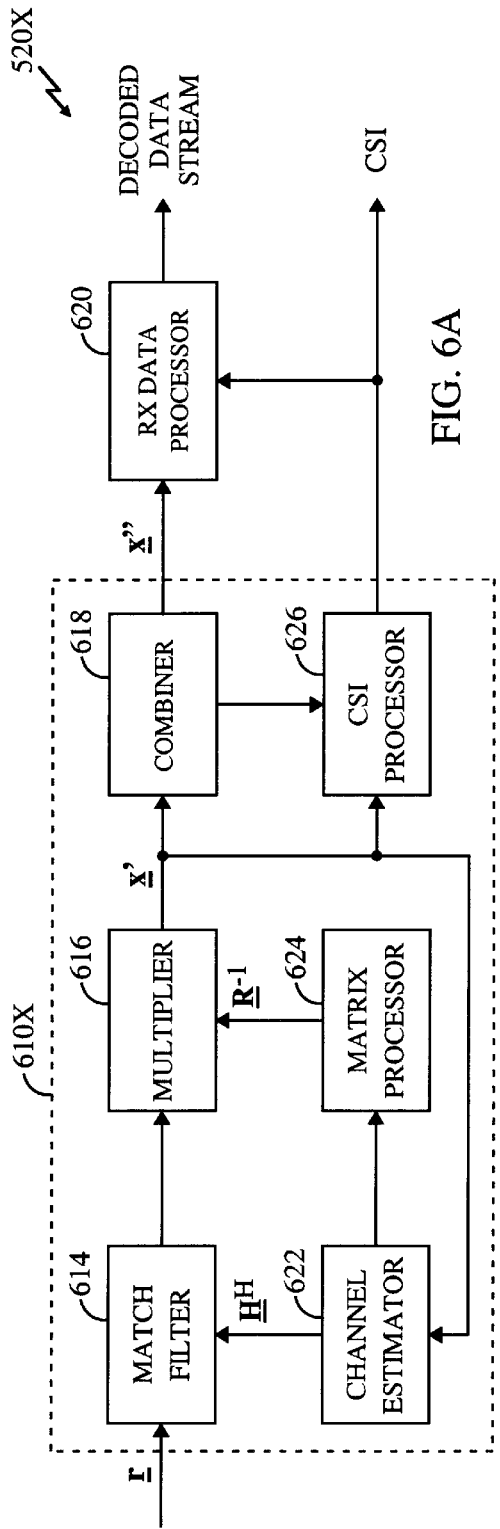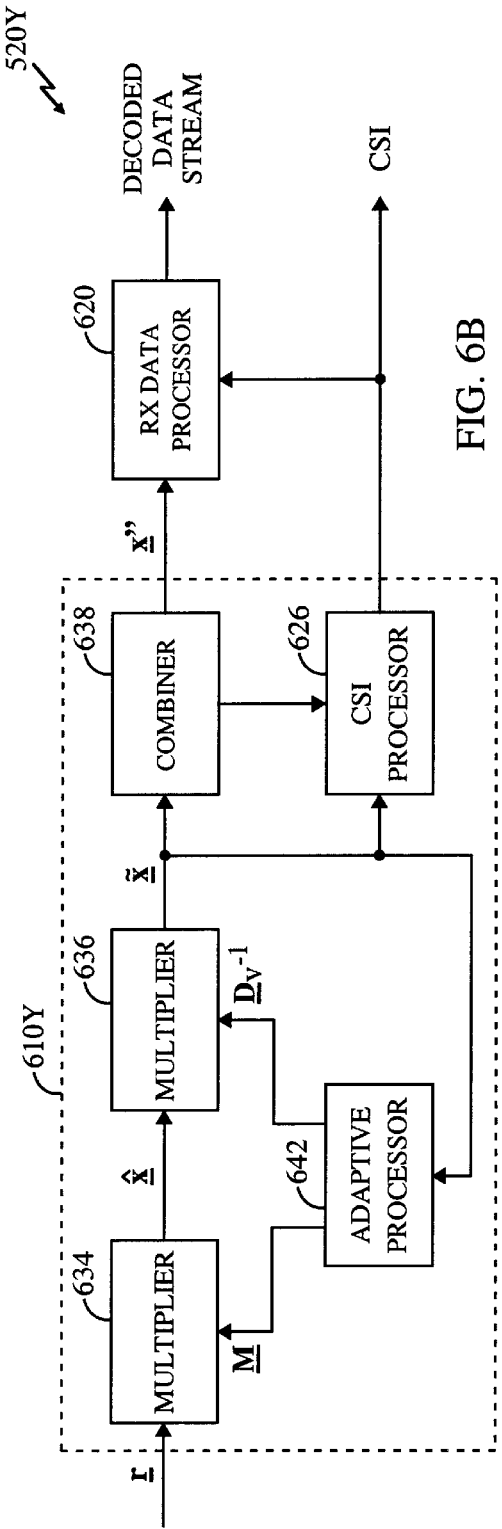

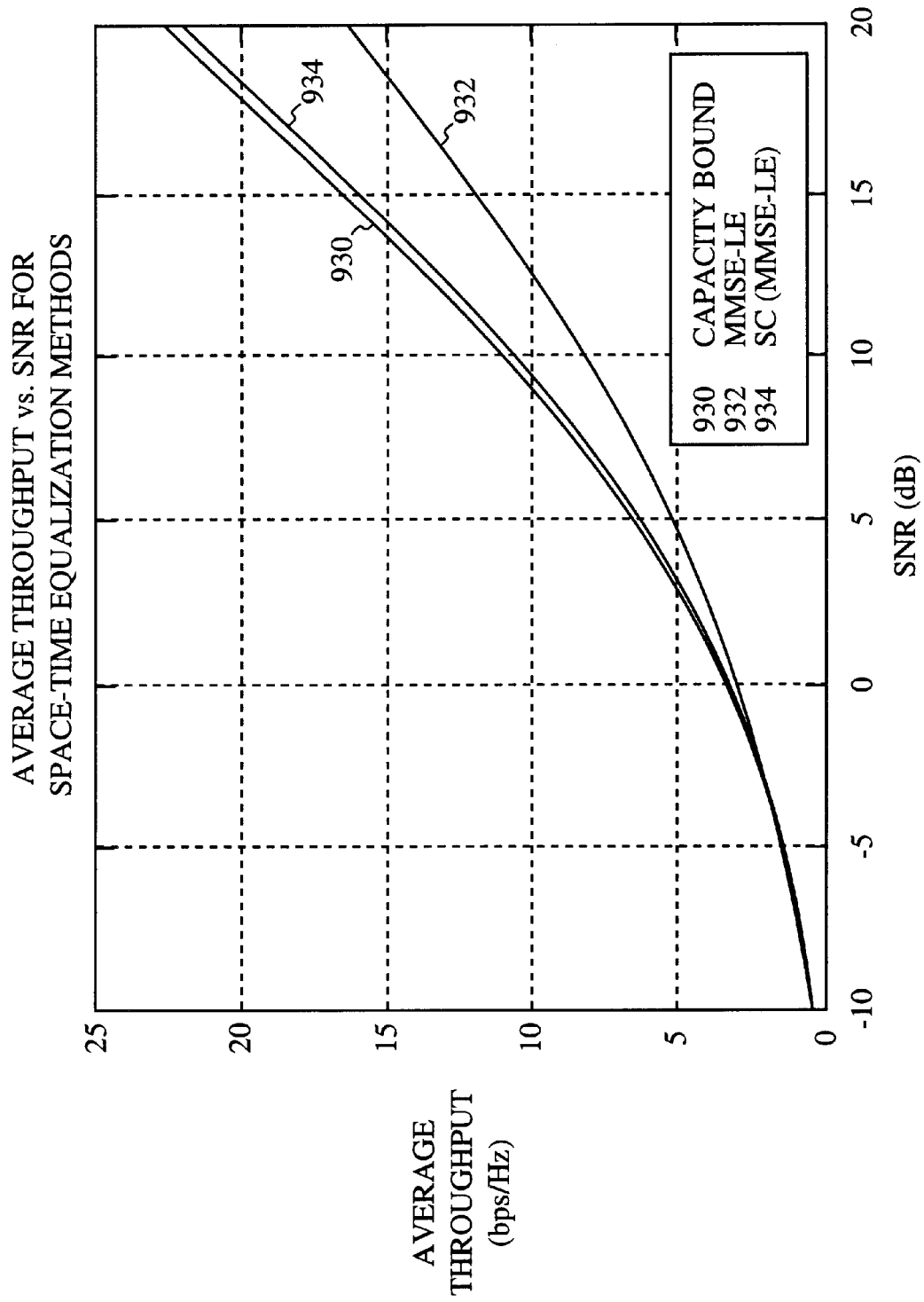

METHOD AND APPARATUS FOR PROCESSING DATA IN A MULTIPLE-INPUT MULTIPLE-OUTPUT (MIMO) COMMUNICATION SYSTEM UTILIZING CHANNEL STATE INFORMATION

BACKGROUND

1. Field

The present invention relates generally to data communication, and more specifically to a novel and improved method and apparatus for processing data in a multiple-input multiple-output (MIMO) communication system utilizing channel state information to provide improved system performance.

2. Background

Wireless communication systems are widely deployed to provide various types of communication such as voice, data, and so on. These systems may be based on code division multiple access (CDMA), time division multiple access (TDMA), orthogonal frequency division multiplex (OFDM), or some other multiplexing techniques. OFDM systems may provide high performance for some channel environments.

In a terrestrial communication system (e.g., a cellular system, a broadcast system, a multi-channel multi-point distribution system (MMDS), and others), an RF modulated signal from a transmitter unit may reach a receiver unit via a number of transmission paths. The characteristics of the transmission paths typically vary over time due to a number of factors such as fading and multipath.

To provide diversity against deleterious path effects and improve performance, multiple transmit and receive antennas may be used for data transmission. If the transmission paths between the transmit and receive antennas are linearly independent (i.e., a transmission on one path is not formed as a linear combination of the transmissions on other paths), which is generally true to at least an extent, then the likelihood of correctly receiving a data transmission increases as the number of antennas increases. Generally, diversity increases and performance improves as the number of transmit and receive antennas increases.

A multiple-input multiple-output (MIMO) communication system employs multiple ($N_T$) transmit antennas and multiple ($N_R$) receive antennas for data transmission. A MIMO channel formed by the $N_T$ transmit and $N_R$ receive antennas may be decomposed into $N_C$ independent channels, with $N_C \leq \min\{N_T, N_R\}$. Each of the $N_C$ independent channels is also referred to as a spatial subchannel of the MIMO channel and corresponds to a dimension. The MIMO system can provide improved performance (e.g., increased transmission capacity) if the additional dimensionalities created by the multiple transmit and receive antennas are utilized.

There is therefore a need in the art for techniques to process a data transmission at both the transmitter and receiver units to take advantage of the additional dimensionalities created by a MIMO system to provide improved system performance.

SUMMARY

Aspects of the invention provide techniques to process the received signals at a receiver unit in a multiple-input multiple-output (MIMO) system to recover the transmitted data, and to adjust the data processing at a transmitter unit based on estimated characteristics of a MIMO channel used for data transmission. In an aspect, a "successive cancellation" receiver processing technique (described below) is used to process the received signals. In another aspect, the channel characteristics are estimated and reported back to the transmitter system and used to adjust (i.e., adapt) the processing (e.g., coding, modulation, and so on) of data prior to transmission. Using a combination of the successive cancellation receiver processing technique and adaptive transmitter processing technique, high performance may be achieved for the MIMO system.

A specific embodiment of the invention provides a method for sending data from a transmitter unit to a receiver unit in a MIMO communication system. In accordance with the method, at the receiver unit, a number of signals are initially received via a number of receive antennas, with each received signal comprising a combination of one or more signals transmitted from the transmitter unit. The received signals are processed in accordance with a successive cancellation receiver processing technique to provide a number of decoded data streams, which are estimates of the data streams transmitted from the transmitter unit. Channel state information (CSI) indicative of characteristics of a MIMO channel used to transmit the data steams are also determined and transmitted back to the transmitter unit. At the transmitter unit, each data stream is adaptively processed prior to transmission over the MIMO channel in accordance with the received CSI.

The successive cancellation receiver processing scheme typically performs a number of iterations to provide the decoded data streams, one iteration for each decoded data stream. For each iteration, a number of input signals for the iteration are processed in accordance with a particular linear or non-linear processing scheme to provide one or more symbol streams. One of the symbol streams is then selected and processed to provide a decoded data stream. A number of modified signals are also derived based on the input signals, with the modified signals having components due to the decoded data stream approximately removed (i.e., canceled). The input signals for a first iteration are the received signals and the input signals for each subsequent iteration are the modified signals from a preceding iteration.

Various linear and non-linear processing schemes may be used to process the input signals. For a non-dispersive channel (i.e., with flat fading), a channel correlation matrix inversion (CCMI) technique, a minimum mean square error (MMSE) technique, or some other techniques may be used. And for a time-dispersive channel (i.e., with frequency selective fading), an MMSE linear equalizer (MMSE-LE), a decision feedback equalizer (DFE), a maximum-likelihood sequence estimator (MLSE), or some other techniques may be used.

The available CSI may include, for example, the signal-to-noise-plus-interference (SNR) of each transmission channel to be used for data transmission. At the transmitter unit, the data for each transmission channel may be coded based on the CSI associated with that channel, and the coded data for each transmission channel may further be modulated in accordance with a modulation scheme selected based on the CSI.

The invention further provides methods, systems, and apparatus that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIGS. 6A, 6B, and 6C are block diagrams of three channel MIMO/data processors, which are capable of implementing a CCMI technique, a MMSE technique, and a DFE technique, respectively;

FIGS. 9A, 9B, and 9C are plots that illustrate the performance for various receiver and transmitter processing schemes.

DETAILED DESCRIPTION

Figure 1:
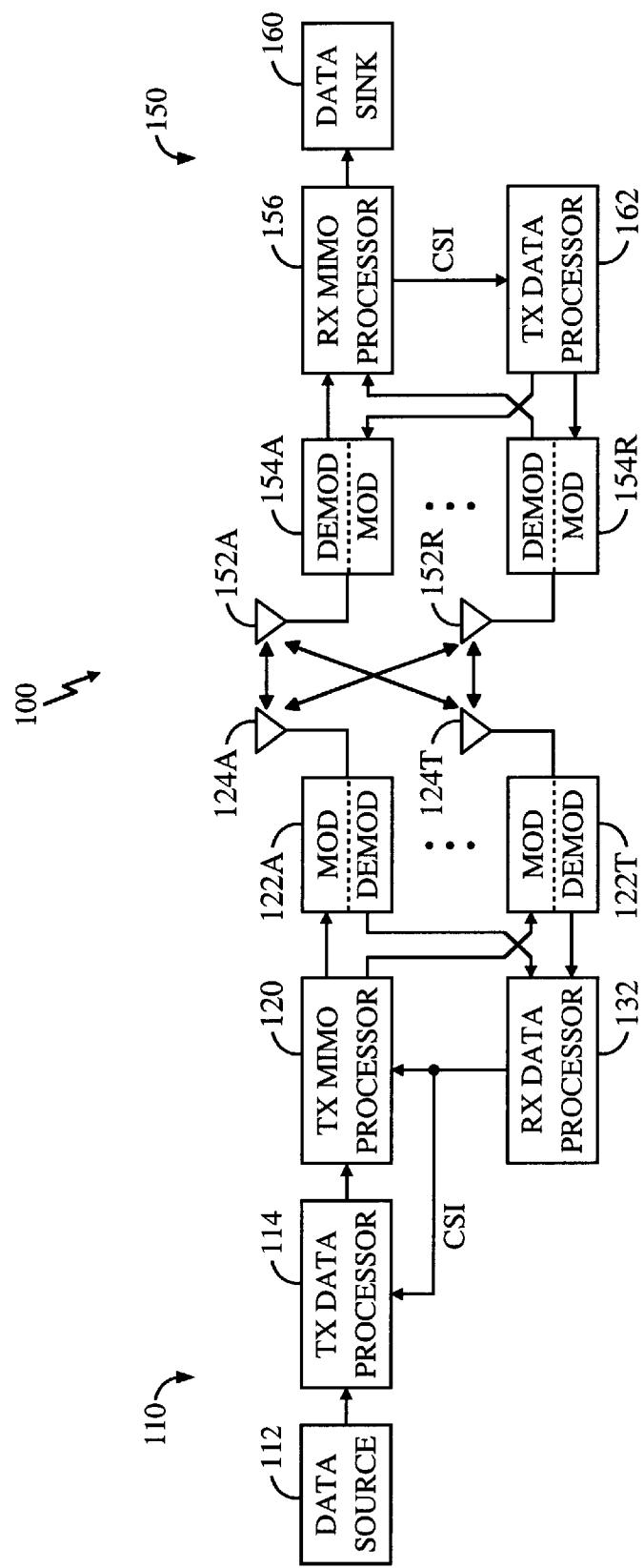
FIG. 1 is a diagram of a multiple-input multiple-output (MIMO) communication system capable of implementing various aspects and embodiments of the invention.

FIG. 1 is a diagram of a multiple-input multiple-output (MIMO) communication system 100 capable of implementing various aspects and embodiments of the invention. System 100 includes a first system 110 in communication with a second system 150. System 100 can be operated to employ a combination of antenna, frequency, and temporal diversity (described below) to increase spectral efficiency, improve performance, and enhance flexibility. In an aspect, system 150 can be operated to determine the characteristics of a MIMO channel and to report channel state information (CSI) indicative of the channel characteristics that have been determined in this way back to system 110, and system 110 can be operated to adjust the processing (e.g., encoding and modulation) of data prior to transmission based on the available CSI. In another aspect, system 150 can be operated to process the data transmission from system 110 in a manner to provide high performance, as described in further detail below.

At system 110, a data source 112 provides data (i.e., information bits) to a transmit (TX) data processor 114, which encodes the data in accordance with a particular encoding scheme, interleaves (i.e., reorders) the encoded data based on a particular interleaving scheme, and maps the interleaved bits into modulation symbols for one or more transmission channels used for transmitting the data. The encoding increases the reliability of the data transmission. The interleaving provides time diversity for the coded bits, permits the data to be transmitted based on an average signal-to-noise-plus-interference-ratio (SNR) for the transmission channels used for the data transmission, combats fading, and further removes correlation between coded bits used to form each modulation symbol. The interleaving may further provide frequency diversity if the coded bits are transmitted over multiple frequency subchannels. In an aspect, the encoding, interleaving, and symbol mapping (or a combination thereof) are performed based on the CSI available to system 110, as indicated in FIG. 1.

The encoding, interleaving, and symbol mapping at transmitter system 110 can be performed based on numerous schemes. One specific scheme is described in U.S. patent application Ser. No. 09/776,073, entitled "CODING SCHEME FOR A WIRELESS COMMUNICATION SYSTEM," filed Feb. 1, 2001, assigned to the assignee of the present application and incorporated herein by reference. Another scheme is described in further detail below.

MIMO system 100 employs multiple antennas at both the transmit and receive ends of the communication link. These transmit and receive antennas may be used to provide various forms of spatial diversity (i.e., antenna diversity), including transmit diversity and receive diversity. Spatial diversity is characterized by the use of multiple transmit antennas and one or more receive antennas. Transmit diversity is characterized by the transmission of data over multiple transmit antennas. Typically, additional processing is performed on the data transmitted from the transmit antennas to achieved the desired diversity. For example, the data transmitted from different transmit antennas may be delayed or reordered in time, coded and interleaved across the available transmit antennas, and so on. Receive diversity is characterized by the reception of the transmitted signals on multiple receive antennas, and diversity is achieved by simply receiving the signals via different signal paths.

System 100 may be operated in a number of different communication modes, with each communication mode employing antenna, frequency, or temporal diversity, or a combination thereof. The communication modes may include, for example, a "diversity" communication mode and a "MIMO" communication mode. The diversity communication mode employs diversity to improve the reliability of the communication link. In a common application of the diversity communication mode, which is also referred to as a "pure" diversity communication mode, data is transmitted from all available transmit antennas to a recipient receiver system. The pure diversity communications mode may be used in instances where the data rate requirements are low or when the SNR is low, or when both are true. The MIMO communication mode employs antenna diversity at both ends of the communication link (i.e., multiple transmit antennas and multiple receive antennas) and is generally used to both improve the reliability and increase the capacity of the communication link. The MIMO communication mode may further employ frequency and/or temporal diversity in combination with the antenna diversity.

System 100 may utilize orthogonal frequency division modulation (OFDM), which effectively partitions the operating frequency band into a number of ($N_L$) frequency subchannels (i.e., frequency bins). At each time slot (i.e., a particular time interval that may be dependent on the bandwidth of the frequency subchannel), a modulation symbol may be transmitted on each of the $N_L$ frequency subchannels.

System 100 may be operated to transmit data via a number of transmission channels. As noted above, a MIMO channel may be decomposed into $N_C$ independent channels, with $N_C \leq \min\{N_T, N_R\}$. Each of the $N_C$ independent channels is also referred to as a spatial subchannel of the MIMO channel. For a MIMO system not utilizing OFDM, there is typically only one frequency subchannel and each spatial subchannel may be referred to as a "transmission channel". For a MIMO system utilizing OFDM, each spatial subchannel of each frequency subchannel may be referred to as a transmission channel.

A MIMO system can provide improved performance if the additional dimensionalities created by the multiple transmit and receive antennas are utilized. While this does not necessarily require knowledge of CSI at the transmitter, increased system efficiency and performance are possible when the transmitter is equipped with CSI, which is descriptive of the transmission characteristics from the transmit antennas to the receive antennas. The processing of data at the transmitter prior to transmission is dependent on whether or not CSI is available.

The available CSI may comprise, for example, the signal-to-noise-plus-interference-ratio (SNR) of each transmission channel (i.e., the SNR for each spatial subchannel for a MIMO system without OFDM, or the SNR for each spatial subchannel of each frequency subchannel for a MIMO system with OFDM). In this case, data may be adaptively processed at the transmitter (e.g., by selecting the proper coding and modulation scheme) for each transmission channel based on the channel's SNR.

For a MIMO system not employing OFDM, TX MIMO processor 120 receives and demultiplexes the modulation symbols from TX data processor 114 and provides a stream of modulation symbols for each transmit antenna, one modulation symbol per time slot. And for a MIMO system employing OFDM, TX MIMO processor 120 provides a stream of modulation symbol vectors for each transmit antenna, with each vector including $N_L$ modulation symbols for the $N_L$ frequency subchannels for a given time slot. Each stream of modulation symbols or modulation symbol vectors is received and modulated by a respective modulator (MOD) 122, and transmitted via an associated antenna 124.

At receiver system 150, a number of receive antennas 152 receive the transmitted signals and provide the received signals to respective demodulators (DEMOD) 154. Each demodulator 154 performs processing complementary to that performed at modulator 122. The modulation symbols from all demodulators 154 are provided to a receive (RX) MIMO/data processor 156 and processed to recover the transmitted data streams. RX MIMO/data processor 156 performs processing complementary to that performed by TX data processor 114 and TX MIMO processor 120 and provides decoded data to a data sink 160. The processing by receiver system 150 is described in further detail below.

The spatial subchannels of a MIMO system (or more generally, the transmission channels in a MIMO system with or without OFDM) typically experience different link conditions (e.g., different fading and multipath effects) and may achieve different SNR. Consequently, the capacity of the transmission channels may be different from channel to channel. This capacity may be quantified by the information bit rate (i.e., the number of information bits per modulation symbol) that may be transmitted on each transmission channel for a particular level of performance (e.g., a particular bit error rate (BER) or packet error rate (PER)). Moreover, the link conditions typically vary with time. As a result, the supported information bit rates for the transmission channels also vary with time. To more fully utilize the capacity of the transmission channels, CSI descriptive of the link conditions may be determined (typically at the receiver unit) and provided to the transmitter unit so that the processing can be adjusted (or adapted) accordingly. The CSI may comprise any type of information that is indicative of the characteristics of the communication link and may be reported via various mechanisms, as described in further detail below. For simplicity, various aspects and embodiments of the invention are described below wherein the CSI comprises SNR. Techniques to determine and utilize CSI to provide improved system performance are described below.

MIMO Transmitter System with CSI Processing

Figure 2:
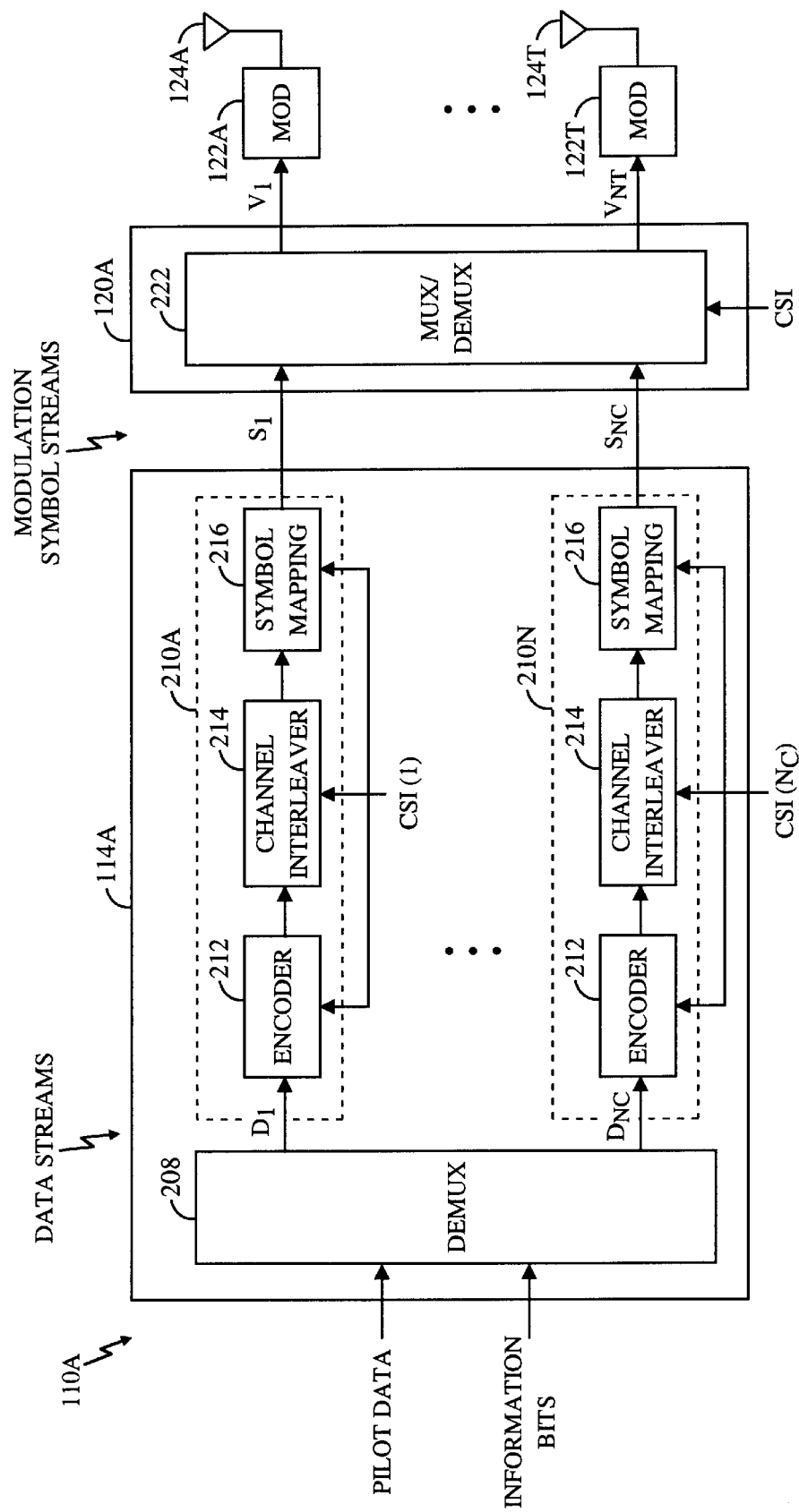
FIG. 2 is a block diagram of an embodiment of a MIMO transmitter system capable of processing data for transmission based on the available CSI.

FIG. 2 is a block diagram of an embodiment of a MIMO transmitter system 110a, which does not utilize OFDM but is capable of adjusting its processing based on CSI available to the transmitter system (e.g., as reported by receiver system 150). Transmitter system 110a is one embodiment of the transmitter portion of system 110 in FIG. 1. System 110a includes (1) a TX data processor 114a that receives and processes information bits to provide modulation symbols and (2) a TX MIMO processor 120a that demultiplexes the modulation symbols for the $N_T$ transmit antennas.

In the specific embodiment shown in FIG. 2, TX data processor 114a includes a demultiplexer 208 coupled to a number of channel data processors 210, one processor for each of the $N_C$ transmission channels. Demultiplexer 208 receives and demultiplexes the aggregate information bits into a number of (up to $N_C$) data streams, one data stream for each of the transmission channels to be used for data transmission. Each data stream is provided to a respective channel data processor 210.

In the embodiment shown in FIG. 2, each channel data processor 210 includes an encoder 212, a channel interleaver 214, and a symbol mapping element 216. Encoder 212 receives and encodes the information bits in the received data stream in accordance with a particular encoding scheme to provide coded bits. Channel interleaver 214 interleaves the coded bits based on a particular interleaving scheme to provide diversity. And symbol mapping element 216 maps the interleaved bits into modulation symbols for the transmission channel used for transmitting the data stream.

Pilot data (e.g., data of known pattern) may also be encoded and multiplexed with the processed information bits. The processed pilot data may be transmitted (e.g., in a time division multiplexed (TDM) manner) in all or a subset of the transmission channels used to transmit the information bits. The pilot data may be used at the receiver to perform channel estimation, as described below.

As shown in FIG. 2, the data encoding, interleaving, and modulation (or a combination thereof) may be adjusted based on the available CSI (e.g., as reported by receiver system 150). In one coding and modulation scheme, adaptive encoding is achieved by using a fixed base code (e.g., a rate 1/3 Turbo code) and adjusting the puncturing to achieve the desired code rate, as supported by the SNR of the transmission channel used to transmit the data. For this scheme, the puncturing may be performed after the channel interleaving. In another coding and modulation scheme, different coding schemes may be used based on the reported CSI. For example, each of the data streams may be coded with an independent code. With this scheme, a "successive cancellation" receiver processing scheme may be used to detect and decode the data streams to derive a more reliable estimate of the transmitted data streams, as described in further detail below.

Symbol mapping element 216 can be designed to group sets of interleaved bits to form non-binary symbols, and to map each non-binary symbol into a point in a signal constellation corresponding to a particular modulation scheme (e.g., QPSK, M-PSK, M-QAM, or some other scheme) selected for the transmission channel. Each mapped signal point corresponds to a modulation symbol.

The number of information bits that may be transmitted for each modulation symbol for a particular level of performance (e.g., one percent PER) is dependent on the SNR of the transmission channel. Thus, the coding and modulation scheme for each transmission channel may be selected based on the available CSI. The channel interleaving may also be adjusted based on the available CSI.

Table 1 lists various combinations of coding rate and modulation scheme that may be used for a number of SNR ranges. The supported bit rate for each transmission channel may be achieved using any one of a number of possible combinations of coding rate and modulation scheme. For example, one information bit per modulation symbol may be achieved using (1) a coding rate of 1/2 and QPSK modulation, (2) a coding rate of 1/3 and 8-PSK modulation, (3) a coding rate of 1/4 and 16-QAM, or some other combination of coding rate and modulation scheme. In Table 1, QPSK, 16-QAM, and 64-QAM are used for the listed SNR ranges. Other modulation schemes such as 8-PSK, 32-QAM, 128-QAM, and so on, may also be used and are within the scope of the invention.

TABLE 1

| SNR Range | # of Information Bits/Symbol | Modulation Symbol | # of Coded Bits/Symbol | Coding Rate |
| --- | --- | --- | --- | --- |
| 1.5–4.4 | 1 | QPSK | 2 | 1/2 |
| 4.4–6.4 | 1.5 | QPSK | 2 | 3/4 |
| 6.4–8.35 | 2 | 16-QAM | 4 | 1/2 |
| 8.35–10.4 | 2.5 | 16-QAM | 4 | 5/8 |
| 10.4–12.3 | 3 | 16-QAM | 4 | 3/4 |
| 12.3–14.15 | 3.5 | 64-QAM | 6 | 7/12 |
| 14.15–15.55 | 4 | 64-QAM | 6 | 2/3 |
| 15.55–17.35 | 4.5 | 64-QAM | 6 | 3/4 |
| >17.35 | 5 | 64-QAM | 6 | 5/6 |

The modulation symbols from TX data processor 114a are provided to a TX MIMO processor 120a, which is one embodiment of TX MIMO processor 120 in FIG. 1. Within TX MIMO processor 120a, a demultiplexer 222 receives (up to) $N_C$ modulation symbol streams from $N_C$ channel data processors 210 and demultiplexes the received modulation symbols into a number of ($N_T$) modulation symbol streams, one stream for each antenna used to transmit the modulation symbols. Each modulation symbol stream is provided to a respective modulator 122. Each modulator 122 converts the modulation symbols into an analog signal, and further amplifies, filters, quadrature modulates, and upconverts the signal to generate a modulated signal suitable for transmission over the wireless link.

MIMO Transmitter System with OFDM

Figure 3:
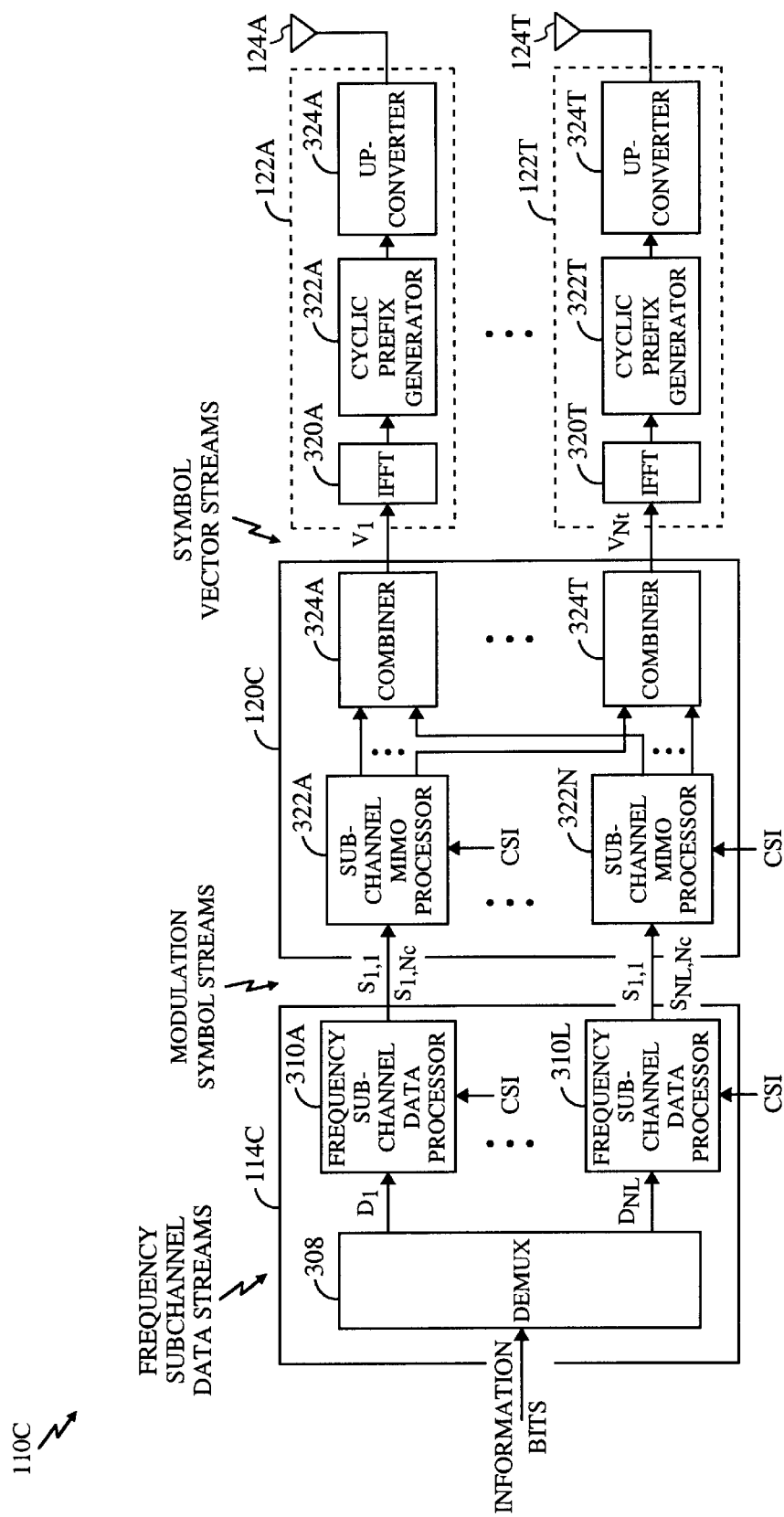
FIG. 3 is a block diagram of an embodiment of a MIMO transmitter system which utilizes orthogonal frequency division modulation (OFDM)

FIG. 3 is a block diagram of an embodiment of a MIMO transmitter system 110c, which utilizes OFDM and is capable of adjusting its processing based on the available CSI. Within a TX data processor 114c, the information bits to be transmitted are demultiplexed into a number of (up to $N_L$) frequency subchannel data streams, one stream for each of the frequency subchannels to be used for the data transmission. Each frequency subchannel data stream is provided to a respective frequency subchannel data processor 310.

Each data processor 310 processes data for a respective frequency subchannel of the OFDM system. Each data processor 310 may be implemented similar to TX data processor 114a shown in FIG. 2. For this design, data processor 310 includes a demultiplexer that demultiplexes the frequency subchannel data stream into a number of data substreams, one substream for each spatial subchannel used for the frequency subchannel. Each data substream is then encoded, interleaved, and symbol mapped by a respective channel data processor to generate modulation symbols for that particular transmission channel (i.e., that spatial subchannel of that frequency subchannel). The coding and modulation for each transmission channel may be adjusted based on the available CSI (e.g., reported by the receiver system). Each frequency subchannel data processor 310 thus provides (up to) $N_C$ modulation symbol streams for (up to) $N_C$ spatial subchannels.

For a MIMO system utilizing OFDM, the modulation symbols may be transmitted on multiple frequency subchannels and from multiple transmit antennas. Within a MIMO processor 120c, the $N_C$ modulation symbol streams from each data processor 310 are provided to a respective channel MIMO processor 322, which processes the received modulation symbols based on the available CSI.

Each channel MIMO processor 322 demultiplexes the $N_C$ modulation symbols for each time slot into $N_T$ modulation symbols for the $N_T$ transmit antennas. Each combiner 324 receives the modulation symbols for up to $N_L$ frequency subchannels, combines the symbols for each time slot into a modulation symbol vector V, and provides the modulation symbol vector to the next processing stage (i.e., a respective modulator 122).

MIMO processor 120c thus receives and processes the modulation symbols to provide $N_T$ modulation symbol vectors, $V_1$ through $V_{N_t}$, one modulation symbol vector for each transmit antenna. Each modulation symbol vector V covers a single time slot, and each element of the modulation symbol vector V is associated with a specific frequency subchannel having a unique subcarrier on which the modulation symbol is conveyed.

FIG. 3 also shows an embodiment of modulator 122 for OFDM. The modulation symbol vectors $V_1$ through $V_{N_t}$ from MIMO processor 120c are provided to modulators 122a through 122t, respectively. In the embodiment shown in FIG. 3, each modulator 122 includes an inverse Fast Fourier Transform (IFFT) 320, cycle prefix generator 322, and an upconverter 324.

IFFT 320 converts each received modulation symbol vector into its time-domain representation (which is referred to as an OFDM symbol) using IFFT. IFFT 320 can be designed to perform the IFFT on any number of frequency subchannels (e.g., 8, 16, 32, and so on). In an embodiment, for each modulation symbol vector converted to an OFDM symbol, cycle prefix generator 322 repeats a portion of the time-domain representation of the OFDM symbol to form a "transmission symbol" for a specific transmit antenna. The cyclic prefix insures that the transmission symbol retains its orthogonal properties in the presence of multipath delay spread, thereby improving performance against deleterious multipath effects. The implementation of IFFT 320 and cycle prefix generator 322 is known in the art and not described in detail herein.

The time-domain representations from each cyclic prefix generator 322 (i.e., the transmission symbols for each antenna) are then processed (e.g., converted into an analog signal, modulated, amplified, and filtered) by upconverter 324 to generate a modulated signal, which is then transmitted from the respective antenna 124.

OFDM modulation is described in further detail in a paper entitled "Multicarrier Modulation for Data Transmission: An Idea Whose Time Has Come," by John A. C. Bingham, IEEE Communications Magazine, May 1990, which is incorporated herein by reference.

FIGS. 2 and 3 show two designs of a MIMO transmitter capable of implementing various aspects of the invention. Other transmitter designs may also be implemented and are within the scope of the invention. Some of these transmitter designs are described in further detail in U.S. patent application Ser. No. 09/532,492, entitled "HIGH EFFICIENCY, HIGH PERFORMANCE COMMUNICATIONS SYSTEM EMPLOYING MULTI-CARRIER MODULATION," filed Mar. 22, 2000, the aforementioned U.S patent application Ser. No. 09/776,073, and U.S patent application Ser. No. 09/816,481 "METHOD AND APPARATUS FOR UTILIZING CHANNEL STATE INFORMATION IN A WIRELESS COMMUNICATION SYSTEM," filed Mar. 23, 2001, all assigned to the assignee of the present application and incorporated herein by reference. These patent applications describe MIMO processing and CSI processing in further detail.

In general, transmitter system 110 codes and modulates data for each transmission channel based on information descriptive of that channel's transmission capability. This information is typically in the form of CSI. The CSI for the transmission channels used for data transmission is typically determined at the receiver system and reported back to the transmitter system, which then uses the information to adjust the coding and modulation accordingly. The techniques described herein are applicable for multiple parallel transmission channels supported by MIMO, OFDM, or any other communication scheme (e.g., a CDMA scheme) capable of supporting multiple parallel transmission channels.

MIMO Receiver System

Aspects of the invention provide techniques to (1) process the received signals at a receiver system in a MIMO system based on a successive cancellation receiver processing scheme to recover the transmitted data, and (2) adjust the data processing at a transmitter system based on estimated characteristics of the MIMO channel. In an aspect, the successive cancellation receiver processing technique (described below) is used to process the received signals. In another aspect, the channel characteristics are estimated at the receiver system and reported back to the transmitter system, which uses the information to adjust (i.e., adapt) the data processing (e.g., coding, modulation, and so on). Using a combination of the successive cancellation receiver processing technique and adaptive transmitter processing technique, high performance may be achieved for the MIMO system.

Figure 4:
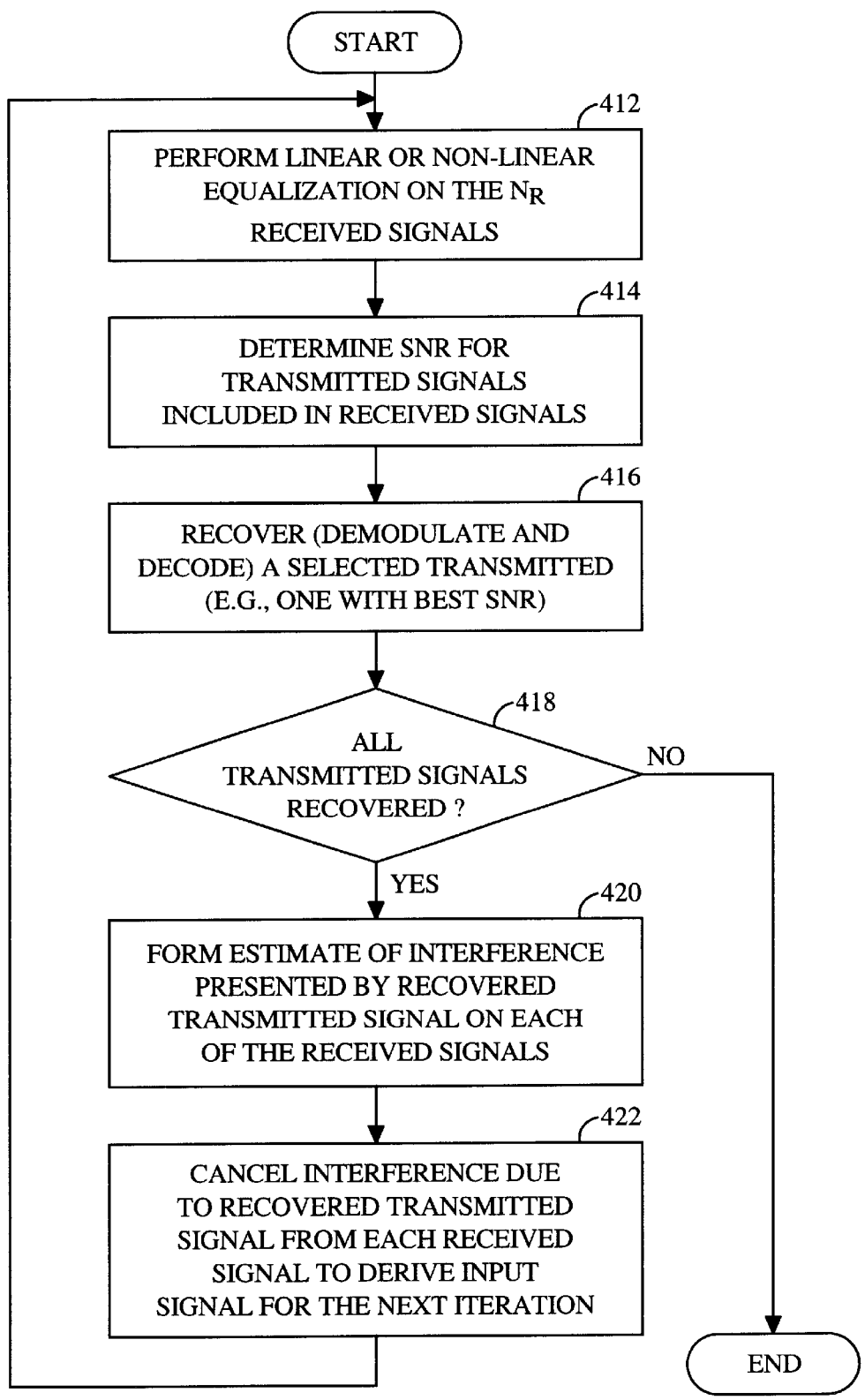
FIG. 4 is a flow diagram illustrating a successive cancellation receiver processing technique to process $N_R$ received signals to recover $N_T$ transmitted signals.

FIG. 4 is a flow diagram illustrating the successive cancellation receiver processing technique to process $N_R$ received signals to recover $N_T$ transmitted signals. For simplicity, the following description for FIG. 4 assumes that (1) the number of transmission channels (i.e., spatial subchannels for a MIMO system not utilizing OFDM) is equal to the number of transmit antenna (i.e., $N_C=N_T$) and (2) one independent data stream is transmitted from each transmit antenna.

Initially, the receiver system performs linear and/or non-linear space-processing on the $N_R$ received signals to attempt to separate the multiple transmitted signals included in the received signals, at step 412. Linear spatial processing may be performed on the received signals if the MIMO channel is "non-dispersive" (i.e., frequency non-selective or flat fading). It may also be necessary or desirable to perform additional linear or non-linear temporal processing (i.e., equalization) on the received signals if the MIMO channel is "time-dispersive" (i.e., frequency selective fading). The spatial processing may be based on a channel correlation matrix inversion (CCMI) technique, a minimum mean square error (MMSE) technique, or some other technique. The space-time processing may be based on an MMSE linear equalizer (MMSE-LE), a decision feedback equalizer (DFE), a maximum-likelihood sequence estimator (MLSE), or some other technique. Some of these spatial and space-time processing techniques are described in further detail below. The amount of achievable signal separation is dependent on the amount of correlation between the transmitted signals, and greater signal separation may be obtained if the transmitted signals are less correlated.

The initial spatial or space-time processing step provides $N_T$ "post-processed" signals that are estimates of the $N_T$ transmitted signals. The SNRs for the $N_T$ post-processed signals are then determined, at step 414. The SNR may be estimated as described in further detail below. In one embodiment, the SNRs are ranked in order from highest to lowest SNR, and the post-processed signal having the highest SNR is selected and further processed (i.e., "detected") to obtain a decoded data stream, at step 416. The detection typically includes demodulating, deinterleaving, and decoding the selected post-processed signal. The decoded data stream is an estimate of the data stream transmitted on the transmitted signal being recovered in this iteration. The particular post-processed signal to be detected may also be selected based on some other scheme (e.g., the particular signal may be specifically identified by the transmitter system).

At step 418, a determination is made whether or not all transmitted signals have been recovered. If all transmitted signals have been recovered, then the receiver processing terminates. Otherwise, the interference due to the decoded data stream is removed from the received signals to generate "modified" signals for the next iteration to recover the next transmitted signal.

At step 420, the decoded data stream is used to form an estimate of the interference presented by the transmitted signal corresponding to the decoded data stream on each of the received signals. The interference can be estimated by first re-encoding the decoded data stream, interleaving the re-encoded data, and symbol mapping the interleaved data (using the same coding, interleaving, and modulation schemes used at the transmitter for this data stream) to obtain a stream of "remodulated" symbols. The remodulated symbol stream is an estimate of the modulation symbol stream previously transmitted from one of the $N_T$ transmit antennas and received by the $N_R$ received antennas. Thus, the remodulated symbol stream is convolved by each of $N_R$ elements in an estimated channel response vector $\underline{h}_i$ to derive $N_R$ interference signals due to the recovered transmitted signal. The vector $\underline{h}_i$ is a particular column of a $(N_R \times N_T)$ channel coefficient matrix H, which represents an estimate of the MIMO channel response for the $N_T$ transmit antennas and $N_R$ receive antennas at a specific time and which may be derived based on pilot signals transmitted along with the data. The $N_R$ interference signals are then subtracted from the $N_R$ corresponding received signals to derive $N_R$ modified signals, at step 422. These modified signals represent the signals at the received antennas if the components due to the decoded data stream had not been transmitted (i.e., assuming that the interference cancellation was effectively performed).

The processing performed in steps 412 through 416 is then repeated on the $N_R$ modified signals (instead of the $N_R$ received signals) to recover another transmitted signal. Steps 412 through 416 are thus repeated for each transmitted signal to be recovered, and steps 420 and 422 are performed if there is another transmitted signal to be recovered.

The successive cancellation receiver processing technique thus performs a number of iterations, one iteration for each transmitted signal to be recovered. Each iteration (except for the last) performs a two-part processing to recover one of the transmitted signals and to generate the modified signals for the next iteration. In the first part, spatial processing or space-time processing is performed on the $N_R$ received signals to provide $N_R$ post-processed signals, and one of the post-processed signals is detected to recover the data stream corresponding to this transmitted signal. In the second part (which needs not be performed for the last iteration), interference due to the decoded data stream is canceled from the received signals to derive modified signals having the recovered component removed.

Initially, the input signals for the first iteration are the received signals, which may be expressed as:

$$\underline{r}^1 = \underline{r} = \begin{bmatrix} r_1 \\ r_2 \\ \vdots \\ r_{N_R} \end{bmatrix}, \quad \text{Eq (1)}$$

where $\underline{r}$ is the vector of $N_R$ received signals and $\underline{r}^1$ is the vector of $N_R$ input signals for the first iteration of the successive cancellation receiver processing scheme. These input signals are linearly or non-linearly processed to provide post-processed signals, which may be expressed as:

$$\underline{x}^1 = \begin{bmatrix} x_1^1 \\ x_2^1 \\ \vdots \\ x_{N_T}^1 \end{bmatrix}. \quad \text{Eq (2)}$$

where $\underline{x}^1$ is the vector of $N_R$ post-processed signals from the first iteration. The SNR of the post-processed signals may be estimated, which may be expressed as:

$$\underline{\gamma}^1 = [\gamma_1^1, \gamma_2^1, \ldots, \gamma_{N_T}^1]. \quad \text{Eq (3)}$$

One of the post-processed signals is selected for further processing (e.g., the post-processed signal with the highest SNR) to provide a decoded data stream. This decoded data stream is then used to estimate the interference $\underline{\hat{i}}^1$ generated by the recovered signal, which may be-expressed as:

$$\underline{\hat{i}}^1 = \begin{bmatrix} \hat{i}_1^1 \\ \hat{i}_2^1 \\ \vdots \\ \hat{i}_{N_R}^1 \end{bmatrix}, \quad \text{Eq (4)}$$

The interference $\underline{\hat{i}}^1$ is then subtracted from the input signal vector $\underline{r}^1$ for this iteration to derive modified signals that comprise the input signal vector $\underline{r}^2$ for the next iteration. The interference cancellation may be expressed as:

$$\underline{r}^2 = \underline{r}^1 - \underline{\hat{i}}^1 = \begin{bmatrix} r_1^1 - \hat{i}_1^1 \\ r_2^1 - \hat{i}_2^1 \\ \vdots \\ r_{N_R}^1 - \hat{i}_{N_R}^1 \end{bmatrix}. \quad \text{Eq (5)}$$

The same process is then repeated for the next iteration, with the vector $\underline{r}^2$ comprising the input signals for this iteration.

With the successive cancellation receiver processing scheme, one transmitted signal is recovered for each iteration, and the SNR for the i-th transmitted signal recovered in the k-th iteration, $\gamma_i^k$, may be provided as the CSI for the transmission channel used to transmit this recovered signal. As an example, if the first post-processed signal $x_1^1$ is recovered in the first iteration, the second post-processed signal $$x_2^2$$

is recovered in the second iteration, and so on, and the $N_T$-th post-processed signal $$x_{N_T}^{N_T}$$

is recovered in the last iteration, then the CSI that may be reported for these recovered signals may be expressed as:

$$\underline{\gamma} = [\gamma_1^1, \gamma_2^2, \ldots, \gamma_{N_T}^{N_T}].$$

Using the successive cancellation receiver processing technique, the original $N_R$ received signals are thus successively processed to recover one transmitted signal at a time. Moreover, each recovered transmitted signal is removed (i.e., canceled) from the received signals prior to the processing to recover the next transmitted signal. If the transmitted data streams can be decoded without error (or with minimal errors) and if the channel response estimate is reasonably accurately, then the cancellation of interference due to previously recovered transmitted signals from the received signals is effective. The interference cancellation typically improves the SNR of each transmitted signal to be subsequently recovered. In this way, higher performance may be achieved for all transmitted signals (possibly except for the first transmitted signal to be recovered).

The possible improvement in SNR for the recovered transmitted signals using the successive cancellation receiver processing technique may be illustrated by an example. In this example, a pair of cross-polarized antennas is employed at both the transmitter and receiver, the MIMO channel is line-of-sight, and four independent data streams are transmitted on the vertical and horizontal components of the pair of cross-polarized transmit antennas. For simplicity, it is assumed that the cross-polarization isolation is perfect so that the vertical and horizontal components do not interfere with one another at the receiver.

The receiver initially receives four signals on the vertical and horizontal components of the pair of cross-polarized received antennas and processes these four received signals. The received signals on the vertical elements of the cross-polarized antennas are highly correlated, and the received signals on the horizontal elements are similarly highly correlated.

When there is a strong linear dependence between two or more transmit-receive antenna pairs composing the MIMO channel, the ability to null interference is compromised. In this case, the linear spatial processing will be unsuccessful at separating the four independent data streams transmitted on the vertical and horizontal components of the pair of cross-polarized antennas. Specifically, the vertical component on each cross-polarized transmit antenna interferes with the vertical component on the other cross-polarized transmit antenna, and similar interference is experienced on the horizontal component. Thus, the resulting SNR for each of the four transmitted signals will be poor due to the correlated interference from the other antenna with the same polarization. As a result, the capacity of the transmitted signals based only on linear spatial processing will be severely constrained by the correlated interference signal.

When the eigenmodes for this example MIMO channel are examined, it can be seen that there are only two non-zero eigenmodes (i.e., the vertical and horizontal polarizations). A "full-CSI" processing scheme would then transmit only two independent data streams using these two eigenmodes. The capacity achieved in this case can be expressed as:

$$\text{Capacity}=2\cdot\log_2(1+\lambda_i/\sigma^2),$$

where $\lambda_i/\sigma^2$ is the ratio of received signal power to thermal noise power for the i-th eigenmode. Thus, the capacity of the full-CSI processing scheme for this example MIMO channel is identical to the capacity of two parallel additive white Gaussian noise (AWGN) channels, each having an SNR given by $\lambda_i/\sigma^2$.

With the successive cancellation receiver processing technique, the linear spatial processing performed in step 412 initially results in the SNR for each of the four transmitted signals being 0 dB or less (due to the noise plus interference from the other transmitted signal on the same polarization). The overall capacity would be poor if no additional receiver processing is performed.

However, by applying successive spatial processing and interference cancellation, the SNR of subsequently recovered transmitted signals can be improved. For example, the first transmitted signal to be recovered may be the vertical polarization from the first cross-polarized transmit antenna. If it is assumed that the interference cancellation is effectively performed (i.e., zero or minimal decision errors and accurate channel estimates), then this signal no longer (or minimally) interferes with the remaining three (not yet recovered) transmitted signals. Removing this vertical polarization interference improves the SNR on the other not yet recovered signal transmitted on the vertical polarization. The cross-polarization isolation was assumed to be perfect for this simple example, and the two signals transmitted on the horizontal polarization do not interference with the signals transmitted on the vertical polarization. Thus, with effective interference cancellation, the signal transmitted on the vertical polarization of the second cross-polarized transmit antenna may be recovered at an SNR that is (theoretically) limited by thermal noise power.

In the above example, removing the interference from the vertical polarization does not impact the SNR of the two signals transmitted on the horizontal polarizations. Thus, the successive spatial processing and interference cancellation are similarly applied for the two signals transmitted on the horizontal polarization. This results in the first recovered signal on the horizontal polarization having a low SNR and the second recovered signal on the horizontal polarization having an SNR that is also (theoretically) limited by thermal noise.

As a result of performing successive spatial processing and interference cancellation, the two transmitted signals with low SNR contribute little to the total capacity, but the two transmitted signals with high SNR contribute in a significant manner to the total capacity.

Non-Dispersive and Dispersive Channels

Different receive and (possibly) transmit processing schemes may be used depending on the characteristics of the MIMO channel, which may be characterized as either non-dispersive or dispersive. A non-dispersive MIMO channel experiences flat fading (i.e., frequency non-selective fading), which may be more likely when the system bandwidth is narrow. A dispersive MIMO channel experiences frequency non-selective fading (e.g., different amount of attenuation across the system bandwidth), which may be more likely when the system bandwidth is wide and for certain operating conditions and environments. The successive cancellation receiver processing technique can be advantageously used for both non-dispersive and dispersive MIMO channels.

For a non-dispersive MIMO channel, linear spatial processing techniques such as CCMI and MMSE may be used to process the received signals prior to demodulation and decoding. These linear spatial processing techniques may be employed at the receiver to null out the undesired signals, or to maximize the received signal-to-interference-plus-noise ratio of each of the constituent signals in the presence of noise and interference from the other signals. The ability to effectively null undesired signals or optimize the signal-to-interference-plus-noise ratios depends upon the correlation in the channel coefficient matrix $\underline{H}$ that describes the channel response between the transmit and receive antennas. The successive cancellation receiver processing technique (e.g., with CCMI or MMSE) can be advantageously used for non-dispersive MIMO channel.

For a dispersive MIMO channel, time dispersion in the channel introduces inter-symbol interference (ISI). To improve performance, a wideband receiver attempting to recover a particular transmitted data stream would need to ameliorate both "crosstalk" from the other transmitted signals as well as inter-symbol interference from all of the transmitted signals. The successive cancellation receiver processing technique can be extended to handle dispersive MIMO channel. To deal with crosstalk and inter-symbol interference, the spatial processing in a narrowband receiver (which handles crosstalk well but does not effectively deal with inter-symbol interference) may be replaced with space-time processing in the wideband receiver. In the wideband receiver, the successive cancellation receiver processing technique may be employed in similar manner as that described above for FIG. 4. However, the spatial processing performed in step 412 is replaced with space-time processing.

In one embodiment, a MMSE linear equalizer (MMSE-LE) may be used for the space-time processing in a wideband receiver. Using the MMSE-LE technique, the space-time processing assumes similar form as the spatial processing for the narrowband channel. However, each "filter tap" in the spatial processor includes more than one tap, as described in further detail below. The MMSE-LE technique is most effective for use in space-time processing when the channel estimates (i.e., the channel coefficient matrix $\underline{H}$) are accurate.

In another embodiment, a decision feedback equalizer (DFE) may be used for the space-time processing at the wideband receiver. The DFE is a non-linear equalizer that is effective for channels with severe amplitude distortion and uses decision feedback to cancel interference from symbols that have already been detected. If the data stream can be decoded without errors (or with minimal errors), then the inter-symbol interference generated by the modulation symbols corresponding to the decoded data bits may be effectively canceled.

In yet another embodiment, a maximum-likelihood sequence estimator (MLSE) may be used for the space-time processing.

The DFE and MLSE techniques may reduce or possibly eliminate the degradation in performance when channel estimates are not as accurate. The DFE and MLSE techniques are described in further detail by S. L. Ariyavistakul et al. in a paper entitled "Optimum Space-Time Processors with Dispersive Interference: Unified Analysis and Required Filter Span," IEEE Trans. on Communication, Vol. 7, No. 7, July 1999, and incorporated herein by reference.

Adaptive transmitter processing based on the available CSI and successive cancellation receiver processing may also be advantageously employed for dispersive MIMO channels. The SNR for a recovered transmitted signal from the output of each space-time processing stage may comprise the CSI for that transmitted signal. This information may be fed back to the transmitter to aid in the selection of an appropriate coding and modulation scheme for the data stream associated with that transmitted signal.

Receiver Structure

Figure 5:
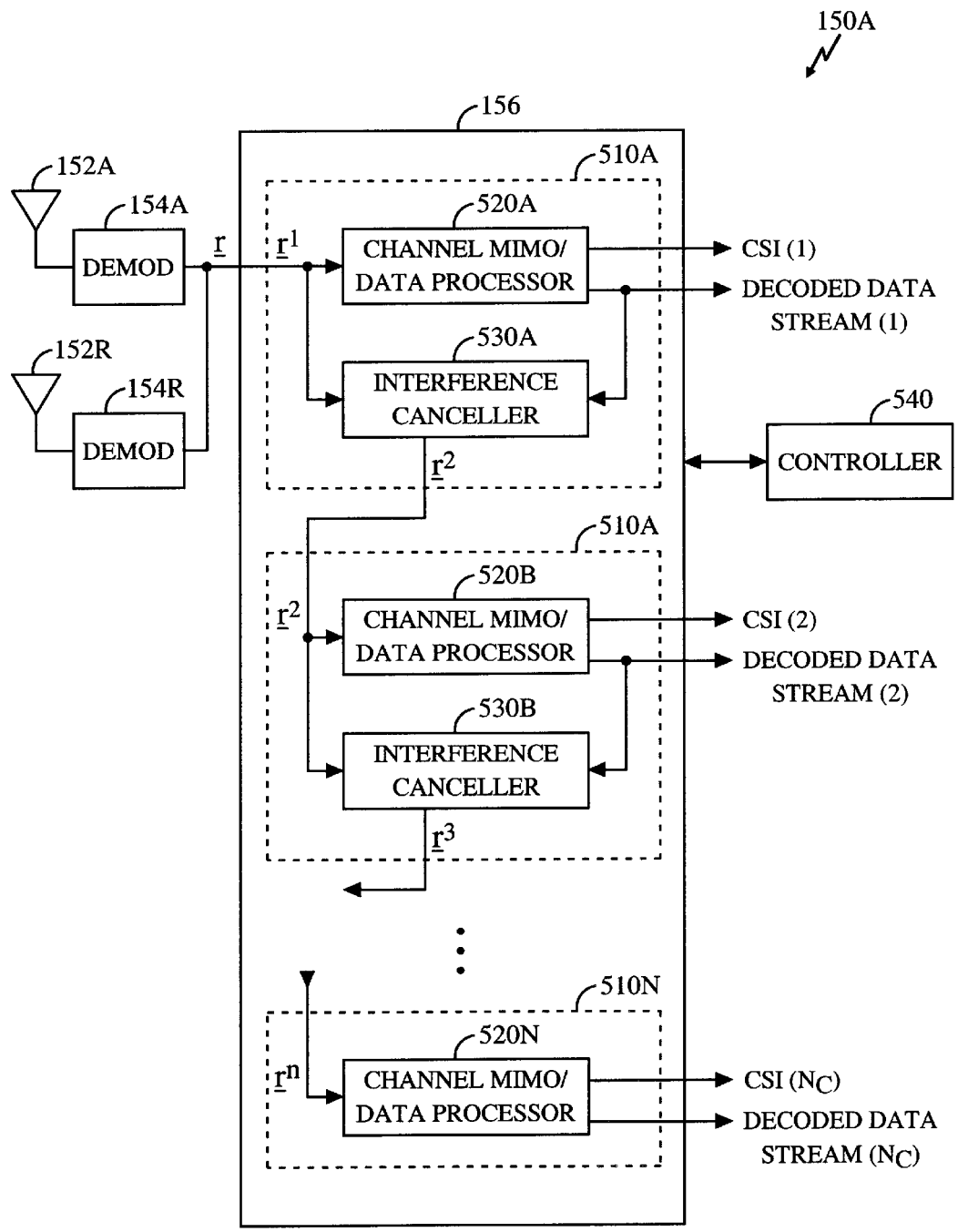
FIG. 5 is a block diagram of a receiver system capable of implementing various aspects and embodiments of the invention.

FIG. 5 is a block diagram of a receiver system 150a capable of implementing various aspects and embodiments of the invention. Receiver system 150a implements the successive cancellation receiver processing technique to receive and recover the transmitted signals. The transmitted signals from (up to) $N_T$ transmit antennas are received by each of $N_R$ antennas 152a through 152r and routed to a respective demodulator (DEMOD) 154 (which is also referred to as a front-end processor). For example, receive antenna 152a may receive a number of transmitted signals from a number of transmit antennas, and receive antenna 152r may similarly receive multiple transmitted signals. Each demodulator 154 conditions (e.g., filters and amplifies) a respective received signal, downconverts the conditioned signal to an intermediate frequency or baseband, and digitizes the downconverted signal to provide samples. Each demodulator 154 may further demodulate the samples with a received pilot to generate a stream of received modulation symbols, which is provided to RX MIMO/data processor 156.

If OFDM is employed for the data transmission, each demodulator 154 further performs processing complementary to that performed by modulator 122 shown in FIG. 3. In this case, each demodulator 154 includes an FFT processor (not shown) that generates transformed representations of the samples and provides a stream of modulation symbol vectors. Each vector includes $N_L$ modulation symbols for $N_L$ frequency subchannels and one vector is provided for each time slot. The modulation symbol vector streams from the FFT processors of all $N_R$ demodulators are then provided to a demultiplexer (not shown in FIG. 5), which "channelizes" the modulation symbol vector stream from each FFT processor into a number of (up to $N_L$) modulation symbol streams. For the transmit processing scheme in which each frequency subchannel is independently processed (e.g., as shown in FIG. 3), the demultiplexer further provides each of (up to) $N_L$ modulation symbol streams to a respective RX MIMO/data processor 156.

For a MIMO system utilizing OFDM, one RX MIMO/data processor 156 may be used to process the $N_R$ modulation symbol streams from the $N_R$ received antennas for each of the $N_L$ frequency subchannels used for data transmission. And for a MIMO system not utilizing OFDM, one RX MIMO/data processor 156 may be used to process the $N_R$ modulation symbol streams from the $N_R$ received antennas.

In the embodiment shown in FIG. 5, RX MIMO/data processor 156 includes a number of successive (i.e., cascaded) receiver processing stages 510, one stage for each of the transmission channels used for data transmission. In one transmit processing scheme, one data stream is transmitted on each transmission channel, and each data stream is independently processed (e.g., with its own encoding and modulation scheme) and transmitted from a respective transmit antenna. For this transmit processing scheme, the number of data streams is equal to the number of transmission channels, which is equal to the number of transmit antennas used for data transmission (which may be a subset of the available transmit antennas). For clarity, RX MIMO/data processor 156 is described for this transmit processing scheme.

Each receiver processing stage 510 (except for the last stage 510n) includes a channel MIMO/data processor 520 coupled to an interference canceller 530, and the last stage 510n includes only channel MIMO/data processor 520n. For the first receiver processing stage 510a, channel MIMO/data processor 520a receives and processes the $N_R$ modulation symbol streams from demodulators 154a through 154r to provide a decoded data stream for the first transmission channel (or the first transmitted signal). And for each of the second through last stages 510b through 510n, channel MIMO/data processor 520 for that stage receives and processes the $N_R$ modified symbol streams from the interference canceller in the preceding stage to derive a decoded data stream for the transmission channel being processed by that stage. Each channel MIMO/data processor 520 further provides CSI (e.g., the SNR) for the associated transmission channel.

For the first receiver processing stage 510a, interference canceller 530a receives the $N_R$ modulation symbol streams from all $N_R$ demodulators 154. And for each of the second through second-to-last stages, interference canceller 530 receives the $N_R$ modified symbol streams from the interference canceller in the preceding stage. Each interference canceller 530 also receives the decoded data stream from channel MIMO/data processor 520 within the same stage, and performs the processing (e.g., encoding, interleaving, modulation, channel response, and so on) to derive $N_R$ remodulated symbol streams that are estimates of the interference components of the received modulation symbol streams due to this decoded data stream. The remodulated symbol streams are then subtracted from the received modulation symbol streams to derive $N_R$ modified symbol streams that include all but the subtracted (i.e., cancelled) interference components. The $N_R$ modified symbol streams are then provided to the next stage.

In FIG. 5, a controller 540 is shown coupled to RX MIMO/data processor 156 and may be used to direct various steps in the successive cancellation receiver processing performed by processor 156.

FIG. 5 shows a receiver structure that may be used in a straightforward manner when each data stream is transmitted over a respective transmit antenna (i.e., one data stream corresponding to each transmitted signal). In this case, each receiver processing stage 510 may be operated to recover one of the transmitted signals and provide the decoded data stream corresponding to the recovered transmitted signal.

For some other transmit processing schemes, a data stream may be transmitted over multiple transmit antennas, frequency subchannels, and/or time intervals to provide spatial, frequency, and time diversity, respectively. For these schemes, the receiver processing initially derives a received modulation symbol stream for the transmitted signal on each transmit antenna of each frequency subchannel. Modulation symbols for multiple transmit antennas, frequency subchannels, and/or time intervals may be combined in a complementary manner as the demultiplexing performed at the transmitter system. The stream of combined modulation symbols is then processed to provide the associated decoded data stream.

Spatial Processing Techniques for Non-Dispersive Channels

As noted above, a number of linear spatial processing techniques may be used to process the signals received via a non-dispersive channel to recover each transmitted signal stream from interference caused by the other transmitted signal streams. These techniques include the CCMI, MMSE, and possibly other techniques. The linear spatial processing is performed within each channel MIMO/data processor 520 on the $N_R$ input signals. For the first receiver processing stage 510a, the input signals are the $N_R$ received signals from the $N_R$ receive antennas. And for each subsequent stage, the input signals are the $N_R$ modified signals from the interference canceller from the preceding stage, as described above. For clarity, the CCMI and MMSE techniques are described for the first stage. However, the processing for each subsequent stage proceeds in similar manner with the proper substitution for the input signals. More specifically, at each subsequent stage the signals detected in the previous stage are assumed to be cancelled, so the dimensionality of the channel coefficient matrix is reduced at each stage as described below.

In a MIMO system with $N_T$ transmit antennas and $N_R$ receive antennas, the received signals at the output of the $N_R$ receive antennas may be expressed as:

$$\underline{r} = \underline{H}\underline{x} + \underline{n}, \qquad \text{Eq (6)}$$

where $\underline{r}$ is the received symbol vector (i.e., the $N_R \times 1$ vector output from the MIMO channel, as derived from the receive antennas), $\underline{H}$ is the channel coefficient matrix, $\underline{x}$ is the transmitted symbol vector (i.e., the $N_T \times 1$ vector input into the MIMO channel), and $\underline{n}$ is an $N_R \times 1$ vector representing noise plus interference. The received symbol vector $\underline{r}$ includes $N_R$ modulation symbols from $N_R$ signals received via $N_R$ receive antennas at a specific time slot. Similarly, the transmitted symbol vector $\underline{x}$ includes $N_T$ modulation symbols in $N_T$ signals transmitted via $N_T$ transmit antennas at a specific time slot. The channel coefficient matrix $\underline{H}$ can be further written as:

$$\underline{H} = [\underline{h}_1 \ \underline{h}_2 \ \ldots \ \underline{h}_{N_T}] \qquad \text{Eq (6a)}$$

where the vectors $\underline{h}_i$ contain the channel coefficients associated with the i-th transmit antenna. At each subsequent step in the successive cancellation process, the column vectors in equation (6a) associated with previously cancelled signals are removed. Assuming for simplicity that the transmit signals are cancelled in the same order that the associated channel coefficient vectors are listed in equation (6a), then at the k-th stage in the successive cancellation process, the channel coefficient matrix is:

$$\underline{H} = [\underline{h}_k \ \underline{h}_{k+1} \ \ldots \ \underline{h}_{N_T}] \qquad \text{Eq (6b)}$$

CCMI Technique

For the CCMI spatial processing technique, the receiver system first performs a channel matched filter operation on the received symbol vector $\underline{r}$. The matched-filtered output can be expressed as:

$$\underline{H}^H \underline{r} = \underline{H}^H \underline{H} \underline{x} + \underline{H}^H \underline{n}, \qquad \text{Eq (7)}$$

where the superscript "$^H$" represents transpose and complex conjugate. A square matrix $\underline{R}$ may be used to denote the product of the channel coefficient matrix $\underline{H}$ with its conjugate-transpose $\underline{H}^H$ (i.e., $\underline{R} = \underline{H}^H \underline{H}$).

The channel coefficient matrix $\underline{H}$ may be derived, for example, from pilot symbols transmitted along with the data. In order to perform "optimal" reception and to estimate the SNR of the transmission channels, it is often convenient to insert some known symbols into the transmit data stream and to transmit the known symbols over one or more transmission channels. Such known symbols are also referred to as pilot symbols or pilot signals. Methods for estimating a single transmission channel based on a pilot signal and/or a data transmission may be found in a number of papers available in the art. One such channel estimation method is described by F. Ling in a paper entitled "Optimal Reception, Performance Bound, and Cutoff-Rate Analysis of References-Assisted Coherent CDMA Communications with Applications," IEEE Transaction On Communication, October 1999. This or some other channel estimation method may be extended to matrix form to derive the channel coefficient matrix $\underline{H}$, as is known in the art.

An estimate of the transmitted symbol vector, $\underline{x}'$, may be obtained by multiplying the matched-filtered vector $\underline{H}^H \underline{r}$ with the inverse (or pseudo-inverse) of $\underline{R}$, which can be expressed as:

$$\begin{aligned} \underline{x}' &= \underline{R}^{-1} \underline{H}^H \underline{r} \\ &= \underline{x} + \underline{R}^{-1} \underline{H}^H \underline{n} \\ &= \underline{x} + \underline{n}'. \end{aligned} \qquad \text{Eq (8)}$$

From the above equation, it can be observed that the transmitted symbol vector $\underline{x}$ may be recovered by matched filtering (i.e., multiplying with the matrix $\underline{H}^H$) the received symbol vector $\underline{r}$ and then multiplying the filtered result with the inverse square matrix $\underline{R}^{-1}$.

For the CCMI technique, the SNR of the received symbol vector after processing (i.e., the i-th element of $\underline{x}'$) can be expressed as:

$$SNR_i = \frac{|x'_i|^2}{\sigma_{n'}^2}. \qquad \text{Eq (9)}$$

If the variance of the i-th transmitted symbol $$\overline{|x'_i|^2}$$

is equal to one (1.0) on the average, the SNR of the receive symbol vector after processing may be expressed as:

$$SNR_i = \frac{1}{r_{ii} \sigma_n^2}.$$

The noise variance may be normalized by scaling the i-th element of the received symbol vector by $1/\sqrt{r_{ii}}$.

If a modulation symbol stream was duplicated and transmitted over multiple transmit antennas, then these modulation symbols may be summed together to form combined modulation symbols. For example, if a data stream was transmitted from all antennas, then the modulation symbols corresponding to all $N_T$ transmit antennas are summed, and the combined modulation symbol may be expressed as:

$$x'_{total} = \sum_{i=1}^{N_T} \frac{x'_i}{\tilde{r}_{ii}}. \qquad \text{Eq (10)}$$

Alternatively, the transmitter may be operated to transmit one or more data streams on a number of transmission channels using the same coding and modulation scheme on some or all transmit antennas. In this case, only one SNR (e.g., an average SNR) may be needed for the transmission channels for which the common coding and modulation scheme is applied. For example, if the same coding and modulation scheme is applied on all transmit antennas, then the SNR of the combined modulation symbol, $SNR_{total}$, can be derived. This $SNR_{total}$ would then have a maximal combined SNR that is equal to the sum of the SNR of the modulation symbols from the $N_T$ transmit antennas. The combined SNR may be expressed as:

$$SNR_{total} = \sum_{i=1}^{N_T} SNR_i = \frac{1}{\sigma_n^2} \sum_{i=1}^{N_T} \frac{1}{\tilde{r}_{ii}}. \qquad \text{Eq (11)}$$

FIG. 6A is a block diagram of an embodiment of a channel MIMO/data processor 520x, which is capable of implementing the CCMI technique described above. Channel MIMO/data processor 520x includes a processor 610x (which performs CCMI processing) coupled to a RX data processor 620.

Within processor 610x, the received modulation symbol vectors $\underline{r}$ are filtered by a match filter 614, which pre-multiplies each vector $\underline{r}$ with the conjugate-transpose channel coefficient matrix $\underline{H}^H$, as shown above in equation (7). The channel coefficient matrix $\underline{H}$ may be estimated based on pilot signals in a manner similar to that used for conventional pilot assisted single and multi-carrier systems, as is known in the art. The matrix $\underline{R}$ is computed according to the equation $\underline{R} = \underline{H}^H \underline{H}$, as shown above. The filtered vectors are further pre-multiplied by a multiplier 616 with the inverse square matrix $\underline{R}^{-1}$ to form an estimate $\underline{x}'$ of the transmitted modulation symbol vector $\underline{x}$, as shown above in equation (8).

For certain transmit processing schemes, the estimated modulation symbol streams corresponding to multiple transmit antennas used for the transmission of a data stream may be provided to a combiner 618, which combines redundant information across time, space, and frequency. The combined modulation symbols x" are then provided to RX data processor 620. For some other transmit processing schemes, the estimated modulation symbols x' may be provided directly (not shown in FIG. 6A) to RX data processor 620.

Processor 610x thus generates a number of independent symbol streams corresponding to the number of data streams transmitted from the transmitter system. Each symbol stream includes recovered modulation symbols that correspond to and are estimates of the modulation symbols after the symbol mapping at the transmitter system. The (recovered) symbol streams are then provided to RX data processor 620.

As noted above, each stage 510 within RX MIMO/data processor 156 recovers and decodes one of the transmitted signals (e.g., the transmitted signal with the best SNR) included in that stage's input signals. The estimation of the SNRs for the transmitted signals is performed by a CSI processor 626, and may be achieved based on equations (9) and (11) described above. CSI processor 626 then provides the CSI (e.g., SNR) for the transmitted signal that has been selected (e.g., the "best") for recovery and decoding, and further provides a control signal identifying the selected transmitted signal.

Figure 7:
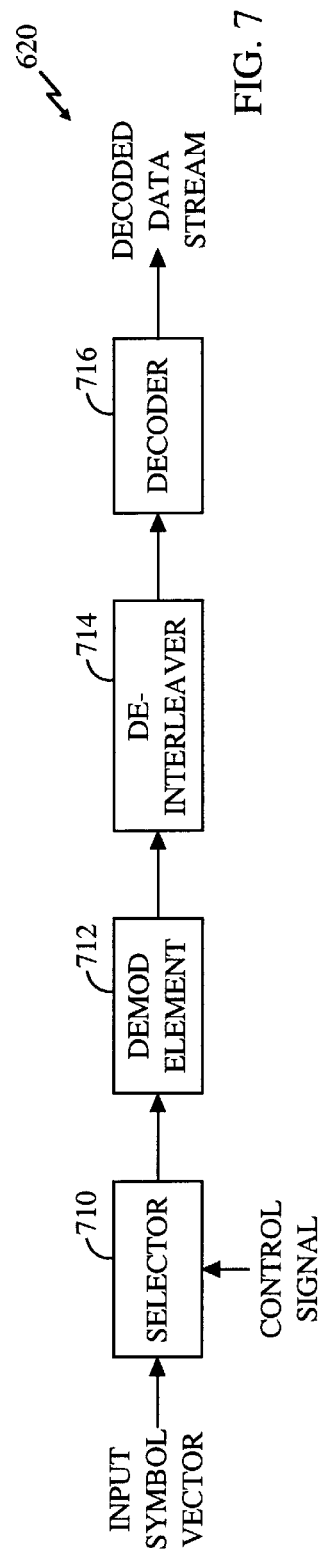
FIG. 7 is a block diagram of an embodiment of a receive (RX) data processor.

FIG. 7 is a block diagram of an embodiment of RX data processor 620. In this embodiment, a selector 710 within RX data processor 620 receives a number of symbol streams from a preceding linear spatial processor and extracts the symbol stream corresponding to the selected transmitted signal, as indicated by the control signal from CSI processor 626. In an alternative embodiment, RX data processor 620 is provided with the symbol stream corresponding to the selected transmitted signal and the stream extraction may be performed by combiner 618 based on the control signal from CSI processor 626. In any case, the extracted stream of modulation symbols is provided to a demodulation element 712.

For the transmitter embodiment shown in FIG. 2 in which the data stream for each transmission channel is independently coded and modulated based on the channel's SNR, the recovered modulation symbols for the selected transmission channel are demodulated in accordance with a demodulation scheme (e.g., M-PSK, M-QAM) that is complementary to the modulation scheme used for the transmission channel. The demodulated data from demodulation element 712 is then de-interleaved by a de-interleaver 714 in a complementary manner to that performed by channel interleaver 214, and the de-interleaved data is further decoded by a decoder 716 in a complementary manner to that performed by encoder 212. For example, a Turbo decoder or a Viterbi decoder may be used for decoder 716 if Turbo or convolutional coding, respectively, is performed at the transmitter. The decoded data stream from decoder 716 represents an estimate of the transmitted data stream being recovered.

Referring back to FIG. 6A, the estimated modulation symbols x' and/or the combined modulation symbols $\underline{x}"$ are also provided to CSI processor 626, which estimates the SNR for each of the transmission channels. For example, CSI processor 626 may estimate the noise covariance matrix $\phi_{nn}$ based on the pilot signals received and then compute the SNR of the i-th transmission channel based on equation (9) or (11). The SNR can be estimated similar to conventional pilot assisted single and multi-carrier systems, as is known in the art. The SNR for all of the transmission channels may comprise the CSI that is reported back to the transmitter system for this transmission channel. CSI processor 626 further provides to RX data processor 620 or combiner 618 the control signal that identifies the selected transmission channel.

The estimated modulation symbols x' are further provided to a channel estimator 622 and a matrix processor 624 that respectively estimates the channel coefficient matrix $\underline{H}$ and derives the square matrix $\underline{R}$. The estimated modulation symbols corresponding to pilot data and/or traffic data may be used for the estimation of the channel coefficient matrix $\underline{H}$.

Referring back to FIG. 5, the input signals to the first stage 510a includes all transmitted signals, and the input signals to each subsequent stage includes one transmitted signal (i.e., one term) canceled by a preceding stage. Thus, channel MIMO/data processor 520a within the first stage 510a may be designed and operated to estimate the channel coefficient matrix $\underline{H}$ and to provide this matrix to all subsequent stages.

The CSI information to be reported by receiver system 150 back to transmitter system 110 may comprise the SNRs for the transmission channels, as determined by the stages within RX MIMO/data processor 156.

MMSE Technique

For the MMSE spatial processing technique, the receiver system first performs a multiplication of the received symbol vector $\underline{r}$ with a weighting coefficient matrix $\underline{M}$ to derive an initial MMSE estimate $\hat{\underline{x}}$ of the transmitted symbol vector $\underline{x}$, which can be expressed as:

$$\hat{\underline{x}} = \underline{M}\underline{r} \qquad \text{Eq (12)}$$
$$= \underline{H}^H\left(\underline{H}\underline{H}^H + \underline{\phi}_{nn}\right)^{-1}\underline{r},$$

where $$\underline{M} = \underline{H}^H(\underline{H}\underline{H}^H + \underline{\phi}_{nn})^{-1}. \qquad \text{Eq (13)}$$

The matrix $\underline{M}$ is selected such that the mean square error of the error vector $\underline{e}$ between the initial MMSE estimate $\hat{\underline{x}}$ and the transmitted symbol vector $\underline{x}$ (i.e., $\underline{e} = \hat{\underline{x}} - \underline{x}$) is minimized.

To determine the SNR of the transmission channels for the MMSE technique, the signal component can first be determined based on the mean of $\hat{\underline{x}}$ given $\underline{x}$, averaged over the additive noise, which can be expressed as:

$$E[\hat{\underline{x}} | \underline{x}] = E[\underline{M}\underline{r} | \underline{x}]$$
$$= \underline{H}^H\left(\underline{H}\underline{H}^H + \underline{\phi}_{nn}\right)^{-1}E[\underline{r}]$$
$$= \underline{H}^H\left(\underline{H}\underline{H}^H + \underline{\phi}_{nn}\right)^{-1}\underline{H}\underline{x}$$
$$= \underline{V}\underline{x},$$

where the matrix $\underline{V}$ can be expressed as:

$$\underline{V} = \underline{H}^H(\underline{\phi}_{nn} + \underline{H}\underline{H}^H)^{-1}\underline{H} = \underline{H}^H\underline{\phi}_{nn}^{-1}\underline{H}(\underline{I} + \underline{H}^H\underline{\phi}_{nn}^{-1}\underline{H})^{-1}.$$

The i-th element $\hat{x}_i$ of the initial MMSE estimate $\hat{\underline{x}}$ can be expressed as:

$$\hat{x}_i = v_{i1}x_1 + \ldots + v_{ii}x_i + \ldots + v_{iN_R}x_{N_R}. \qquad \text{Eq (14)}$$

If all of the elements of $\hat{\underline{x}}$ are uncorrelated and have zero mean, the expected value of the i-th element of $\hat{\underline{x}}$ can be expressed as:

$$E[\hat{x}_i | \underline{x}] = v_{ii}x_i. \qquad \text{Eq (15)}$$

As shown in equation (15), $\hat{x}_i$ is a biased estimate of $x_i$ and this bias can be removed to obtain improved performance. An unbiased estimate of $x_i$ can be obtained by dividing $\hat{x}_i$ by $v_{ii}$. Thus, the unbiased minimum mean square error estimate of $\underline{x}$, $\tilde{\underline{x}}$, can be obtained by pre-multiplying the biased estimate $\hat{\underline{x}}$ by a diagonal matrix $\underline{D}_V^{-1}$, as follows:

$$\tilde{\underline{x}} = \underline{D}_V^{-1}\hat{\underline{x}} \qquad \text{Eq (16)}$$

where $$\underline{D}_V^{-1} = \text{diag}(1/v_{11}, 1/v_{22}, \ldots, 1/v_{N_R N_R}), \qquad \text{Eq (17)}$$

and $v_{ii}$ are the diagonal elements of the matrix $\underline{V}$.

To determine the noise plus interference, the error $\hat{\underline{e}}$ between the unbiased estimate $\tilde{\underline{x}}$ and the transmitted symbol vector $\underline{x}$ can be expressed as:

$$\hat{\underline{e}} = \underline{x} - \underline{D}_V^{-1}\hat{\underline{x}}$$
$$= \underline{x} - \underline{D}_V^{-1}\underline{H}^H\left(\underline{H}\underline{H}^H + \underline{\phi}_{nn}\right)^{-1}\underline{r}.$$

For the MMSE technique, the SNR of the received symbol vector after processing (i.e., the i-th element of $\tilde{\underline{x}}$) can be expressed as:

$$SNR_i = \frac{E[|\overline{x_i}|^2]}{u_{ii}}. \qquad \text{Eq (18)}$$

where $u_{ii}$ is the variance of the i-th element of the error vector $\hat{\underline{e}}$, and the matrix $U$ can be expressed as:

$$\underline{U} = \underline{I} - \underline{D}_V^{-1}\underline{V} - \underline{V}\underline{D}_V^{-1} + \underline{D}_V^{-1}\underline{V}\underline{D}_V^{-1}. \qquad \text{Eq (19)}$$

If the variance, $\overline{|x_i|^2}$, of the i-th transmitted symbol, $x_i$, is equal to one (1.0) on the average, and from equation (19)

$$u_{ii} = \frac{1}{v_{ii}} - 1,$$

then the SNR of the received symbol vector after processing may be expressed as:

$$SNR_i = \frac{v_{ii}}{1 - v_{ii}}. \qquad \text{Eq (20)}$$

The estimated modulation symbols, $\tilde{\underline{x}}$, may similarly be combined to obtain combined modulation symbols, as described above for the CCMI technique.

FIG. 6B is a block diagram of an embodiment of a channel MIMO/data processor 520y, which is capable of implementing the MMSE technique described above. Channel MIMO/data processor 520y includes a processor 610y (which performs MMSE processing) coupled to RX data processor 620.

Within processor 610y, the received modulation symbol vectors $\underline{r}$ are pre-multiplied with the matrix $\underline{M}$ by a multiplier 634 to form an estimate $\hat{\underline{x}}$ of the transmitted symbol vector $\underline{x}$, as shown above in equation (8). Similar to the CCMI technique, the matrices $\underline{H}$ and $\underline{\phi}_{nn}$ may be estimated based on the received pilot signals and/or data transmissions. The matrix $\underline{M}$ is then computed according to equation (9). The estimate $\hat{\underline{x}}$ is further pre-multiplied with the diagonal matrix $\underline{D}_V^{-1}$ by a multiplier 636 to form an unbiased estimate $\tilde{\underline{x}}$ of the transmitted symbol vector $\underline{x}$, as shown above in equation (12).

Again, for certain transmit processing schemes, a number of streams of estimated modulation symbols $\tilde{\underline{x}}$ corresponding to a number of transmit antennas used for transmitting a data stream may be provided to a combiner 638, which combines redundant information across time, space, and frequency. The combined modulation symbols $\tilde{\underline{x}}$ are then provided to RX data processor 620. For some other transmit processing schemes, the estimated modulation symbols $\tilde{\underline{x}}$ may be provided directly (not shown in FIG. 6B) to RX data processor 620. RX data processor 620 demodulates, de-interleaves, and decodes the modulation symbol stream corresponding to the data stream being recovered, as described above.

The estimated modulation symbols $\tilde{\underline{x}}$ and/or the combined modulation symbols $\tilde{\underline{x}}$ are also provided to CSI processor 626, which estimates the SNR for each of the transmitted signals. For example, CSI processor 626 may estimate the SNR of the i-th transmitted signal based on equation (18) or (20). The SNR for the selected transmitted signal may be reported back to the transmitter system. CSI processor 626 further provides to RX data processor 620 or combiner 618 the control signal that identifies the selected transmitted signal.

The estimated modulation symbols $\tilde{x}$ are further provided to an adaptive processor 642 that derives the matrix $\underline{M}$ and the diagonal matrix $\underline{D}_V^{-1}$ based on equations (13) and (17), respectively.

Space-Time Processing Techniques for Time-Dispersive Channels

As noted above, a number of space-time processing techniques may be used to process the signals received via a time-dispersive channel. These techniques include the use of time domain channel equalization techniques such as MMSE-LE, DFE, MLSE, and possibly other techniques, in conjunction with the spatial processing techniques described above for a non-dispersive channel. The space-time processing is performed within each channel MIMO/data processor 520 on the $N_R$ input signals.

MMSE-LE Technique

In the presence of time dispersion, the channel coefficient matrix $\underline{H}$ takes on a delay dimension, and each element of the matrix $\underline{H}$ behaves as a linear transfer function instead of a coefficient. In this case, the channel coefficient matrix $\underline{H}$ can be written in the form of a channel transfer function matrix $\underline{H}(\tau)$, which can be expressed as:

$$\underline{H}(\tau) = \{h_{ij}(\tau)\} \text{ for } 1 \leq i \leq N_R, \text{ and } 1 \leq j \leq N_T. \quad \text{Eq (21)}$$

where $h_{ij}(\tau)$ is the linear transfer function from the j-th transmit antenna to the i-th receive antenna. As a result of the linear transfer functions $h_{ij}(\tau)$, the received signal vector $\underline{r}(t)$ is a convolution of the channel transfer function matrix $\underline{H}(\tau)$ with the transmitted signal vector $\underline{x}(t)$, which can be expressed as:

$$\underline{r}(t) = \int \underline{H}(\tau)\underline{x}(t-\tau)d\tau. \quad \text{Eq (22)}$$

As part of the demodulation function (performed by demodulators 154 in FIG. 5), the received signals are sampled to provide received samples. Without loss of generality, the time-dispersive channel and the received signals can be represented in a discrete-time representation in the following description. First, the channel transfer function vector $\underline{h}_j(k)$ associated with the j-th transmit antenna at delay k can be expressed as:

$$\underline{h}_j(k) = [h_{1j}(k) h_{2j}(k) \ldots h_{N_R j}(k)]^T \text{ for } 0 \leq k \leq L, \quad \text{Eq (23)}$$

where $h_{ij}(k)$ is the k-th tap weight of the channel transfer function associated with the path between the j-th transmit antenna and the i-th receive antenna and L is the maximum extent (in sample intervals) of the channel time dispersion. Next, the $N_R \times N_T$ channel transfer function matrix at delay k can be expressed as:

$$\underline{H}(k) = [\underline{h}_1(k) \underline{h}_2(k) \ldots \underline{h}_{N_T}(k)] \text{ for } 0 \leq k \leq L. \quad \text{Eq (24)}$$

The received signal vector $\underline{r}(n)$ at sample time n can then be expressed as:

$$\underline{r}(n) = \sum_{k=0}^{L} \underline{H}(k)\underline{x}(n-k) + \underline{n}(n) = \underline{\underline{H}}\,\underline{x}(n) + \underline{n}(n), \quad \text{Eq (25)}$$

where $\underline{\underline{H}}$ is an $N_R \times (L+1)N_T$ block-structured matrix that represents the sampled channel matrix transfer function, $\underline{H}(k)$, and can be represented as:

$$\underline{\underline{H}} = [\underline{H}(0) \underline{H}(1) \ldots \underline{H}(L)],$$

and $\underline{\underline{x}}(n)$ is a sequence of L+1 vectors of received samples captured for L+1 sample intervals, with each vector comprising $N_R$ samples for the $N_R$ received antennas, and can be represented as:

$$\underline{\underline{x}}(n) = \begin{bmatrix} \underline{x}(n) \\ \underline{x}(n-1) \\ \vdots \\ \underline{x}(n-L) \end{bmatrix}.$$

An MMSE linear space-time processor computes an estimate of the transmitted symbol vector, $\hat{\underline{x}}(n)$, at time n by performing a convolution of the sequence of received signal vectors $\underline{r}(n)$ with the sequence of 2K+1, $N_R \times N_T$ weight matrices $\underline{M}(k)$, as follows:

$$\hat{\underline{x}}(n) = \sum_{k=-K}^{K} \underline{M}(k)\underline{r}(n-k) = \underline{\underline{M}}\,\underline{\underline{r}}(n), \quad \text{Eq (26)}$$

where $\underline{\underline{M}} = [\underline{M}(-K) \ldots \underline{M}(0) \ldots \underline{M}(K)]$, K is a parameter that determines the delay-extent of the equalizer filter, and $$\underline{\underline{r}}(n) = \begin{bmatrix} \underline{r}(n+K) \\ \vdots \\ \underline{r}(n) \\ \vdots \\ \underline{r}(n-K) \end{bmatrix}.$$

The sequence of weight matrices $\underline{M}(k)$ is selected to minimize the mean-square error, which can be expressed as:

$$\epsilon = E\{\underline{e}^H(k)\underline{e}(k)\}, \quad \text{Eq (27)}$$

where the error $\underline{e}(k)$ can be expressed as:

$$\underline{e}(k) = \hat{\underline{x}}(k) - \underline{x}(k). \quad \text{Eq (28)}$$

The MMSE solution can then be stated as the sequence of weight matrices $\underline{M}(k)$ that satisfy the linear constraints:

$$\sum_{k=-K}^{K} \underline{M}(k)\underline{R}(k-l) = \begin{cases} 0, & -K \leq l < -L \\ \underline{H}^H(-l), & -L \leq l \leq 0 \\ 0, & 0 < l \leq K \end{cases}, \quad \text{Eq (29)}$$

where $\underline{R}(k)$ is a sequence of $N_R \times N_R$ space-time correlation matrices, which can be expressed as:

$$\underline{R}(k) = E\{\underline{r}(n-k)\underline{r}^H(n)\} = \begin{cases} \sum_{m=\max(0,-k)}^{\min(L,L-k)} \underline{H}(m)\underline{H}^H(m+k) + \underline{\varphi}_{zz}(k), & -L \le k \le L \\ \underline{\varphi}_{zz}(k), & \text{otherwise} \end{cases} \quad \text{Eq (30)}$$

where $\underline{\phi}_{zz}(k)$ is the noise autocorrelation function, which can be expressed as:

$$\underline{\phi}_{zz}(k) = E\{\underline{z}(l-k)\underline{z}^H(l)\}. \quad \text{Eq (31)}$$

For white (temporally uncorrelated) noise, $\underline{\phi}_{zz}(k) = \underline{\phi}_{zz}\delta(k)$, where $\underline{\phi}_{zz}$ in this case represents only the spatial correlation matrix. For spatially and temporally uncorrelated noise with equal power at each receive antenna, $\underline{\phi}_{zz}(k) = \sigma^2 \underline{I}\delta(k)$.

Equation (29) can further be represented as:

$$\underline{MR} = \underline{\tilde{H}}^H, \text{ or } \underline{M} = \underline{\tilde{H}}^H \underline{R}^{-1}, \quad \text{Eq (32)}$$

where $\underline{R}$ is block-Toeplitz with block j,k given by $\underline{R}(j-k)$ and $$\underline{\tilde{H}} = \begin{bmatrix} \underline{0}_{(K-L)N_R \times N_T} \\ \underline{H}(L) \\ \underline{H}(L-1) \\ \vdots \\ \underline{H}(0) \\ \underline{0}_{K,N_R \times N_T} \end{bmatrix},$$

where $\underline{0}_{m \times n}$ is an m×n matrix of zeros.

As with the MMSE spatial processing described above, to determine the SNR associated with the symbol estimates, an unbiased minimum mean square error estimate is derived. First, for the MMSE-LE estimate derived above, $$E[\hat{\underline{x}}(n) \mid \underline{x}(n)] = \underline{M}E[\underline{r}(n) \mid \underline{x}(n)] \quad \text{Eq (33)}$$

$$[\underline{M}(-K)\underline{H}\underline{x}(n+K) + \cdots + \underline{M}(0)\underline{H}\underline{x}(n) + \cdots + \underline{M}(K)\underline{H}\underline{x}(n-K)],$$

where the expectation is taken over the noise. If it is assumed that the modulation symbols are uncorrelated in time and the expectation is taken over all intersymbol interference in the above (all transmitted signal components not transmitted at time n), then the expectation can be expressed as:

$$E[\hat{\underline{x}}(n) \mid \underline{x}(n)] = \underline{M}E[\underline{r}(n) \mid \underline{x}(n)] \quad \text{Eq (34)}$$

$$= [\underline{M}(0)\underline{H}(0) + \underline{M}(-1)\underline{H}(1) + \cdots + \underline{M}(-L)\underline{H}(L)]\underline{x}(n)$$

$$= \underline{M}\underline{\tilde{H}}\underline{x}(n)$$

$$= \underline{V}\underline{x}(n)$$

where $$\underline{V} = \underline{M}\underline{\tilde{H}} = \underline{\tilde{H}}^H \underline{R}^{-1} \underline{\tilde{H}}.$$

Finally, after averaging over the interference from other spatial subchannels, the average value of the signal from the i-th transmit antenna at time n can be expressed as:

$$E[\hat{x}_i(n) \mid x_i(n)] = v_{ii} x_i(n), \quad \text{Eq (35)}$$

where $v_{ii}$ is the i-th diagonal element of $\underline{V}$ ($v_{ii}$ is a scalar), and $\hat{x}_i(n)$ is the i-th element of the MMSE-LE estimate.

By defining $$\underline{D}_V^{-1} = \text{diag}(1/v_{11}, 1/v_{22}, \ldots, 1/v_{N_T N_T}), \quad \text{Eq (36)}$$

then the unbiased MMSE-LE estimate of the transmitted signal vector at time n can be expressed as:

$$\underline{\tilde{x}}(n) = \underline{D}_V^{-1}\hat{\underline{x}}(n) = \underline{D}_V^{-1}\underline{M}\underline{r}(n). \quad \text{Eq (37)}$$

The error covariance matrix associated with the unbiased MMSE-LE can be expressed as:

$$\underline{\varphi}_{ee} = \underline{U} = E\{[\underline{x}(n) - \underline{D}_V^{-1}\underline{M}\underline{r}(n)][\underline{x}(n) - \underline{r}^H(n)\underline{M}^H\underline{D}_V^{-1}]\} \quad \text{Eq (38)}$$

$$= \underline{I} - \underline{D}_V^{-1}\underline{V} - \underline{V}\underline{D}_V^{-1} + \underline{D}_V^{-1}\underline{V}\underline{D}_V^{-1}.$$

The SNR associated with the estimate of the symbol transmitted on the i-th transmit antenna can finally be expressed as:

$$SNR_i = \frac{1}{u_{ii}} = \frac{v_{ii}}{1 - v_{ii}}. \quad \text{Eq (39)}$$

The MMSE-LE technique can be implemented by channel MIMO/data processor 520y in FIG. 6B. In this case, multiplier 634 can be designed to perform the convolution of the sequence of received signal vectors $\underline{r}(n)$ with the sequence of weight matrices $\underline{M}(k)$, as shown in equation (26). Multiplier 636 can be designed to perform the pre-multiply of the estimate $\hat{\underline{x}}$ with the diagonal matrix $\underline{D}_V^{-1}$ to derive the unbiased MMSE-LE estimate $\underline{\tilde{x}}$, as shown in equation (37). Adaptive processor 642 can be designed to derive the sequence of weight matrices $\underline{M}(k)$ as shown in equation (32) and the diagonal matrix $\underline{D}_V^{-1}$ as shown in equation (36). The subsequent processing may be achieved in similar manner as that described above for the MMSE technique. The SNR of the symbol stream transmitted from the j-th transmit antenna may be estimated based on equation (39) by CSI processor 626.

DFE Technique

Figure 6C:
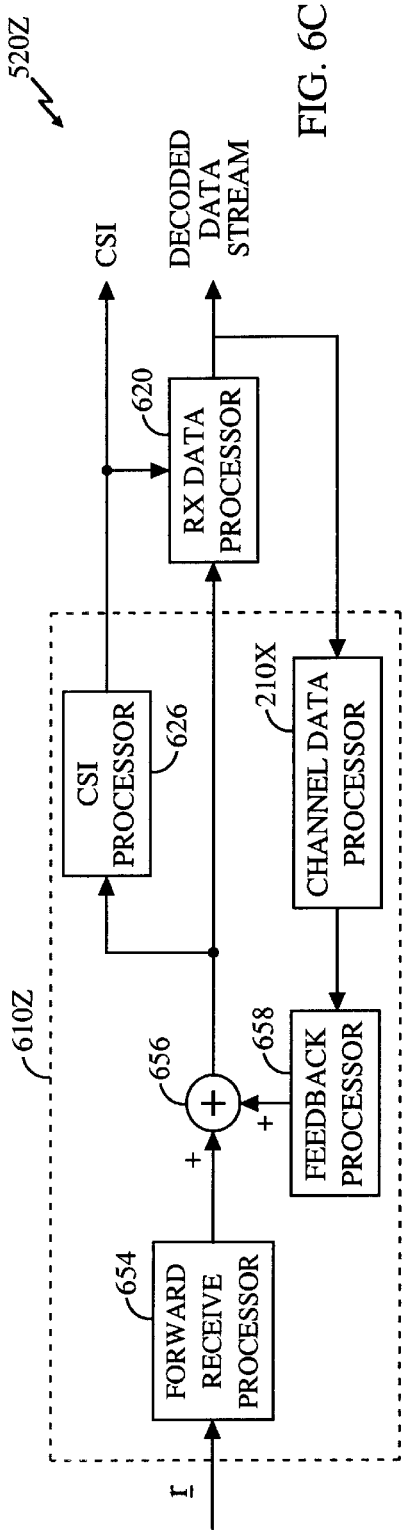

FIG. 6C is a block diagram of an embodiment of a channel MIMO/data processor 520z, which is capable of implementing the DFE spatial-time equalization technique. Channel MIMO/data processor 520z includes a space-time processor 610z, which performs DFE processing, coupled to RX data processor 620.

For the DFE technique, the received modulation symbol vectors r(n) are received and processed by a forward receive processor 654 to provide estimated modulation symbols for the data stream to be recovered. Forward receive processor 654 may implement the CCMI or MMSE technique described above or some other linear spatial equalization technique. A summer 656 then combines an estimated distortion components provided by a feedback processor 658 with the estimated modulation symbols to provide "equalized" modulation symbols having the distortion component removed. Initially, the estimated distortion components are zero and the equalized modulation symbols are simply the estimated modulation symbols. The equalized modulation symbols from summer 656 are then demodulated and decoded by RX data processor 620 to provide the decoded data stream.

The decoded data stream is then re-encoded and re-modulated by a channel data processor 210x to provide remodulated symbols, which are estimates of the modulation symbols at the transmitter. Channel data processor 210x performs the same processing (e.g., encoding, interleaving, and modulation) as that performed at the transmitter for the data stream, e.g., as shown in FIG. 2. The remodulated symbols from channel data processor 210x are provided to feedback processor 658, which processes the symbols to derive the estimated distortion components. Feedback processor 658 may implement a linear spatial equalizer (e.g., a linear transversal equalizer).

The resulting estimate of the transmitted symbol vector at time n can be expressed as:

$$\hat{\underline{x}}(n) = \sum_{k=-K_1}^{0} \underline{M}_f(k)\underline{r}(n-k) + \sum_{k=1}^{K_2} \underline{M}_b(k)\underline{\tilde{x}}(n-k), \quad \text{Eq (40)}$$

where $\underline{r}(n)$ is the vector of received modulation symbols, which is given above in equation (25), $\underline{\tilde{x}}(n)$ is the vector of symbol decisions provided by the channel data processor 210x, $\underline{M}_f(k)$, $-K_1 \leq k \leq 0$ is the sequence of $(K_1+1)-(N_T \times N_R)$ feed-forward coefficient matrices used by forward receive processor 654, and $\underline{M}_b(k)$, $1 \leq k \leq K_2$ is the sequence of $K_2$-$(N_T \times N_R)$ feed-back coefficient matrices used by feedback processor 658. Equation (40) can also be expressed as:

$$\hat{\underline{x}}(n) = \underline{M}_f \underline{r}(n) + \underline{M}_b \underline{\tilde{x}}(n), \quad \text{Eq (41)}$$

where $$\underline{M}_f = [\underline{M}(-K_1)\ \underline{M}(-K_1+1)\ \ldots\ \underline{M}(0)],\ \underline{M}_b = [\underline{M}(1)\ \underline{M}(2)\ \ldots\ \underline{M}(k_2)],$$

$$\underline{\tilde{x}}(n) = \begin{bmatrix} \tilde{x}(n-1) \\ \tilde{x}(n-2) \\ \vdots \\ \tilde{x}(n-K_2) \end{bmatrix}, \text{ and } \underline{r}(n) = \begin{bmatrix} r(n+K_1) \\ r(n+K_1-1) \\ \vdots \\ r(n) \end{bmatrix}.$$

If the MMSE criterion is used to find the coefficient matrices, then the solutions for $\underline{M}_f$ and $\underline{M}_b$ that minimize the mean square error $\epsilon = E\{\underline{e}^H(k)\underline{e}(k)\}$ can be used, where the error $\underline{e}(k)$ is expressed as:

$$\underline{e}(k) = \hat{\underline{x}}(k) - \underline{x}(k).$$

The MMSE solution for the feed-forward filter can then be expressed as:

$$\underline{M}_f = \underline{\tilde{H}}^H \underline{\tilde{R}}^{-1}, \quad \text{Eq (42)}$$

where $$\underline{\tilde{H}} = \begin{bmatrix} \underline{0}_{(K_1-L)N_R \times N_T} \\ \underline{H}(L) \\ \underline{H}(L-1) \\ \vdots \\ \underline{H}(0) \end{bmatrix},$$

and $\underline{\tilde{R}}$ is a $(K_1+1)N_R \times (K_1+1)N_R$ matrix made up of $N_R \times N_R$ blocks. The (i,j)-th block in $\underline{\tilde{R}}$ is given by:

$$\underline{\tilde{R}}(i,j) = \sum_{m=0}^{K_1-i+1} \underline{H}(m)\underline{H}^H(m+i-j) + \sigma^2 \underline{I}\delta(i-j). \quad \text{Eq (43)}$$

The MMSE solution for the feed-back filter is:

$$\underline{M}_b(k) = -\sum_{j=-K_1}^{0} \underline{M}_f(j)\underline{H}(k-j),\ 1 \leq k \leq K_2. \quad \text{Eq (44)}$$

As in the MMSE-LE described above, the unbiased estimate is first determined by finding the conditional mean value of the transmitted symbol vector:

$$E[\hat{\underline{x}}(n)|\underline{x}(n)] = \underline{H}\underline{\tilde{M}}x(n) = \underline{V}_{dfe}\underline{x}(n), \quad \text{Eq (45)}$$

where $\underline{V}_{dfe} = \underline{M}_f \underline{\tilde{H}} = \underline{\tilde{H}}^H \underline{\tilde{R}}^{-1} \underline{\tilde{H}}$. Next, the mean value of the i-th element of $\hat{\underline{x}}(n)$, $\hat{x}_i(n)$, is expressed as:

$$E[\hat{x}_i(n)|x_i(n)] = v_{dfe,ii} x_i(n),$$

where $v_{dfe,ii}$ is the i-th diagonal element of $\underline{V}_{dfe}$. To form the unbiased estimate, similar to that described above, the diagonal matrix whose elements are the inverse of the diagonal elements of $\underline{V}_{dfe}$ is first defined as:

$$\underline{D}_{Vdfe}^{-1} = \text{diag}(v_{dfe,11}, v_{dfe,22}, \ldots, v_{dfe,N_TN_T}). \quad \text{Eq (46)}$$

Then the unbiased estimate is expressed as:

$$\hat{\hat{\underline{x}}}(n) = \underline{D}_{Vdfe}^{-1}\hat{\underline{x}}(n) = \underline{D}_{Vdfe}^{-1}\underline{M}_f \underline{r}(n) + \underline{D}_{Vdfe}^{-1}\underline{M}_b \underline{\tilde{x}}(n). \quad \text{Eq (47)}$$

The resulting error covariance matrix is given by:

$$\varphi_{ee} = \underline{U}_{dfe} = E\left\{ \left[ x(n) - \underline{D}_{Vdfe}^{-1}\left( \underline{M}_f \underline{r}(n) + \underline{M}_b \underline{\tilde{x}}(n) \right) \right] \right. \quad \text{Eq (48)}$$
$$\left. \left[ \underline{x}^H(n) - \left( \underline{r}^H(n)\underline{M}_f^H + \underline{\tilde{x}}^H(n)\underline{M}_b^H \right)\underline{D}_{Vdfe}^{-1} \right] \right\}$$
$$= I - \underline{D}_{Vdfe}^{-1}\underline{V}_{dfe} - \underline{V}_{dfe}\underline{D}_{Vdfe}^{-1} + \underline{D}_{Vdfe}^{-1}\underline{V}_{dfe}\underline{D}_{Vdfe}^{-1}$$

The SNR associated with the estimate of the symbol transmitted on the i-th transmit antenna can then be expressed as:

$$SNR_i = \frac{1}{u_{dfe,ii}} = \frac{v_{dfe,ii}}{1 - v_{dfe,ii}}. \quad \text{Eq (49)}$$

With the DFE technique, the decoded data stream is used to derive an estimate of the distortion generated by the already decoded information bits. If the data stream is decoded without errors (or with minimal errors), then the distortion component can be accurately estimated and the inter-symbol interference contributed by the already decoded information bits may be effectively canceled out. The processing performed by forward receive processor 654 and feedback processor 658 are typically adjusted simultaneously to minimize the mean square error (MSE) of the inter-symbol interference in the equalized modulation symbols. DFE processing is described in further detail in the aforementioned paper by Ariyavistakul et al.

Interference Cancellation

Figure 8:
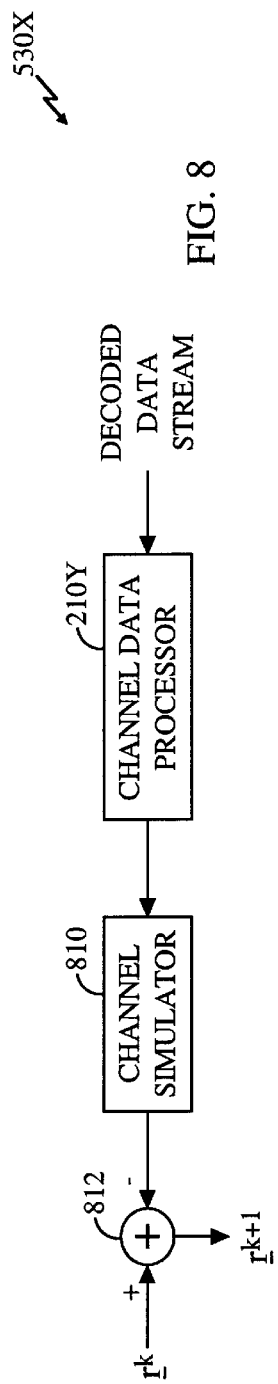
FIG. 8 is a block diagram of an interference canceller.

FIG. 8 is a block diagram of an interference canceller 530x, which is one embodiment of interference canceller 530 in FIG. 5. Within interference canceller 530x, the decoded data stream from the channel MIMO/data processor 520 within the same stage is re-encoded, interleaved, and re-modulated by a channel data processor 210y to provide remodulated symbols, which are estimates of the modulation symbols at the transmitter prior to the MIMO processing and channel distortion. Channel data processor 210y performs the same processing (e.g., encoding, interleaving, and modulation) as that performed at the transmitter for the data stream. The remodulated symbols are then provided to a channel simulator 810, which processes the symbols with the estimated channel response to provide estimates of the interference due the decoded data stream.

For a non-dispersive channel, channel simulator 810 multiples the remodulated symbol stream associated with the i-th transmit antenna with the vector $\underline{\hat{h}}_i$, which is an estimate of the channel response between the i-th transmit antenna for which the data stream is being recovered and each of the $N_R$ receive antennas. The vector $\underline{\hat{H}}_i$ may be expressed as:

$$\underline{\hat{h}}_i = \begin{bmatrix} \hat{h}_{i,1} \\ \hat{h}_{i,2} \\ \vdots \\ \hat{h}_{i,N_R} \end{bmatrix}, \quad \text{Eq (50)}$$

and is one column of an estimated channel response matrix $\underline{\hat{H}}$ that can be expressed as:

$$\underline{\hat{H}} = \begin{bmatrix} \hat{h}_{1,1} & \hat{h}_{2,1} & \cdots & \hat{h}_{N_T,1} \\ \hat{h}_{1,2} & \hat{h}_{2,2} & \cdots & \hat{h}_{N_T,2} \\ \vdots & \vdots & \ddots & \vdots \\ \hat{h}_{1,N_R} & \hat{h}_{2,N_R} & \cdots & \hat{h}_{N_T,N_R} \end{bmatrix}. \quad \text{Eq (51)}$$

The matrix $\underline{\hat{H}}$ may be provided by the channel MIMO/data processor 520 within the same stage.

If the remodulated symbol stream corresponding to the i-th transmit antenna is expressed as $\breve{x}_i$, then the estimated interference component $\hat{\underline{i}}^i$ due to the recovered transmitted signal may be expressed as:

$$\hat{\underline{i}}^i = \begin{bmatrix} \hat{h}_{i,1} \cdot \breve{x}_i \\ \hat{h}_{i,2} \cdot \breve{x}_i \\ \vdots \\ \hat{h}_{i,N_R} \cdot \breve{x}_i \end{bmatrix}. \quad \text{Eq (52)}$$

The $N_R$ elements in the interference vector $\hat{\underline{i}}^i$ correspond to the component of the received signal at each of the $N_R$ receive antennas due to symbol stream transmitted on the i-th transmit antenna. Each element of the vector represents an estimated component due to the decoded data stream in the corresponding received modulation symbol stream. These components are interference to the remaining (not yet detected) transmitted signals in the $N_R$ received modulation symbol streams (i.e., the vector $\underline{r}^k$), and are subtracted (i.e., canceled) from the received signal vector $\underline{r}^k$ by a summer 812 to provide a modified vector $\underline{r}^{k+1}$ having the components from the decoded data stream removed. This cancellation can be expressed as shown above in equation (5). The modified vector $\underline{r}^{k+1}$ is provided as the input vector to the next receiver processing stage, as shown in FIG. 5.

For a dispersive channel, the vector $\underline{\hat{h}}_i$ is replaced with an estimate of the channel transfer function vector defined in equation (23), $\underline{\hat{h}}_i(k)$, $0 \leq k \leq L$. Then the estimated interference vector at time n, $\hat{\underline{i}}(n)$, may be expressed as:

$$\hat{\underline{i}}^i(n) = \begin{bmatrix} \sum_{k=0}^{L} \hat{h}_{i1}(k)\breve{x}_i(n-k) \\ \sum_{k=0}^{L} \hat{h}_{i2}(k)\breve{x}_i(n-k) \\ \vdots \\ \sum_{k=0}^{L} \hat{h}_{iN_R}(k)\breve{x}_i(n-k) \end{bmatrix}, \quad \text{Eq (53)}$$

where $\breve{x}_i(n)$ is the remodulated symbol for time n. Equation (54) effectively convolves the remodulated symbols with the channel response estimates for each transmit-receive antenna pair.

For simplicity, the receiver architecture shown in FIG. 5 provides the (received or modified) modulation symbol streams to each receiver processing stage 510, and these streams have the interference components due to previously decoded data streams removed (i.e., canceled). In the embodiment shown in FIG. 5, each stage removes the interference components due to the data stream decoded by that stage. In some other design, the received modulation symbol streams may be provided to all stages, and each stage may perform the cancellation of interference components from all previously decoded data streams (which may be provided from preceding stages). The interference cancellation may also be skipped for one or more stages (e.g., if the SNR for the data stream is high). Various modifications to the receiver architecture shown in FIG. 5 may be made and are within the scope of the invention.

Deriving and Reporting CSI

For simplicity, various aspects and embodiments of the invention have been described above wherein the CSI comprises SNR. In general, the CSI may comprise any type of information that is indicative of the characteristics of the communication link. Various types of information may be provided as CSI, some examples of which are described below.

In one embodiment, the CSI comprises signal-to-noise-plus-interference ratio (SNR), which is derived as the ratio of the signal power over the noise plus interference power. The SNR is typically estimated and provided for each transmission channel used for data transmission (e.g., each transmit data stream), although an aggregate SNR may also be provided for a number of transmission channels. The SNR estimate may be quantized to a value having a particular number of bits. In one embodiment, the SNR estimate is mapped to an SNR index, e.g., using a look-up table.

In another embodiment, the CSI comprises signal power and interference plus noise power. These two components may be separately derived and provided for each transmission channel used for data transmission.

In yet another embodiment, the CSI comprises signal power, interference power, and noise power. These three components may be derived and provided for each transmission channel used for data transmission.

In yet another embodiment, the CSI comprises signal-to-noise ratio plus a list of interference powers for each observable interference term. This information may be derived and provided for each transmission channel used for data transmission.

In yet another embodiment, the CSI comprises signal components in a matrix form (e.g., $N_T \times N_R$ complex entries for all transmit-receive antenna pairs) and the noise plus interference components in matrix form (e.g., $N_T \times N_R$ complex entries). The transmitter unit may then properly combine the signal components and the noise plus interference components for the appropriate transmit-receive antenna pairs to derive the quality for each transmission channel used for data transmission (e.g., the post-processed SNR for each transmitted data stream, as received at the receiver unit).

In yet another embodiment, the CSI comprises a data rate indicator for the transmit data stream. The quality of a transmission channel to be used for data transmission may be determined initially (e.g., based on the SNR estimated for the transmission channel) and a data rate corresponding to the determined channel quality may then be identified (e.g., based on a look-up table). The identified data rate is indicative of the maximum data rate that may be transmitted on the transmission channel for the required level of performance. The data rate is then mapped to and represented by a data rate indicator (DRI), which can be efficiently coded. For example, if (up to) seven possible data rates are supported by the transmitter unit for each transmit antenna, then a 3-bit value may be used to represent the DRI where, e.g., a zero can indicate a data rate of zero (i.e., don't use the transmit antenna) and 1 through 7 can be used to indicate seven different data rates. In a typical implementation, the quality measurements (e.g., SNR estimates) are mapped directly to the DRI based on, e.g., a look-up table.

In yet another embodiment, the CSI comprises an indication of the particular processing scheme to be used at the transmitter unit for each transmit data stream. In this embodiment, the indicator may identify the particular coding scheme and the particular modulation scheme to be used for the transmit data stream such that the desired level of performance is achieved.

In yet another embodiment, the CSI comprises a differential indicator for a particular measure of quality for a transmission channel. Initially, the SNR or DRI or some other quality measurement for the transmission channel is determined and reported as a reference measurement value. Thereafter, monitoring of the quality of the transmission channel continues, and the difference between the last reported measurement and the current measurement is determined. The difference may then be quantized to one or more bits, and the quantized difference is mapped to and represented by the differential indicator, which is then reported. The differential indicator may indicate to increase or decrease the last reported measurement by a particular step size (or to maintain the last reported measurement). For example, the differential indicator may indicate that (1) the observed SNR for a particular transmission channel has increased or decreased by a particular step size, or (2) the data rate should be adjusted by a particular amount, or some other change. The reference measurement may be transmitted periodically to ensure that errors in the differential indicators and/or erroneous reception of these indicators do not accumulate.

Other forms of CSI may also be used and are within the scope of the invention. In general, the CSI includes sufficient information in whatever form that may be used to adjust the processing at the transmitter such that the desired level of performance is achieved for the transmitted data streams.

The CSI may be derived based on the signals transmitted from the transmitter unit and received at the receiver unit. In an embodiment, the CSI is derived based on a pilot reference included in the transmitted signals. Alternatively or additionally, the CSI may be derived based on the data included in the transmitted signals.

In yet another embodiment, the CSI comprises one or more signals transmitted on the reverse link from the receiver unit to the transmitter unit. In some systems, a degree of correlation may exist between the forward and reverse links (e.g. time division duplexed (TDD) systems where the uplink and downlink share the same band in a time division multiplexed manner). In these systems, the quality of the forward link may be estimated (to a requisite degree of accuracy) based on the quality of the reverse link, which may be estimated based on signals (e.g., pilot signals) transmitted from the receiver unit. The pilot signals would then represent a means for which the transmitter could estimate the CSI as observed by the receiver unit.

The signal quality may be estimated at the receiver unit based on various techniques. Some of these techniques are described in the following patents, which are assigned to the assignee of the present application and incorporated herein by reference:

U.S. Pat. No. 5,799,005, entitled "SYSTEM AND METHOD FOR DETERMINING RECEIVED PILOT POWER AND PATH LOSS IN A CDMA COMMUNICATION SYSTEM," issued Aug. 25, 1998, U.S. Pat. No. 5,903,554, entitled "METHOD AND APPARATUS FOR MEASURING LINK QUALITY IN A SPREAD SPECTRUM COMMUNICATION SYSTEM," issued May 11, 1999, U.S. Pat. Nos. 5,056,109, and 5,265,119, both entitled "METHOD AND APPARATUS FOR CONTROLLING TRANSMISSION POWER IN A CDMA CELLULAR MOBILE TELEPHONE SYSTEM," respectively issued Oct. 8, 1991 and Nov. 23, 1993, and U.S. Pat. No. 6,097,972, entitled "METHOD AND APPARATUS FOR PROCESSING POWER CONTROL SIGNALS IN CDMA MOBILE TELEPHONE SYSTEM," issued Aug. 1, 2000.

Various types of information for CSI and various CSI reporting mechanisms are also described in U.S. Pat. No. 6,574,211, entitled "METHOD AND APPARATUS FOR HIGH RATE PACKET DATA TRANSMISSION," filed Nov. 3, 1997, and issued on Jun. 3, 2003 to Padovani et al. assigned to the assignee of the present application, and in "TIE/EIA/IS-856 cdma2000 High Rate Packet Data Air Interface Specification", both of which are incorporated herein by reference.

The CSI may be reported back to the transmitter using various CSI transmission schemes. For example, the CSI may be sent in full, differentially, or a combination thereof. In one embodiment, CSI is reported periodically, and differential updates are sent based on the prior transmitted CSI.

In another embodiment, the CSI is sent only when there is a change (e.g., if the change exceeds a particular threshold), which may lower the effective rate of the feedback channel. As an example, the SNRs may be sent back (e.g., differentially) only when they change. For an OFDM system (with or without MIMO), correlation in the frequency domain may be exploited to permit reduction in the amount of CSI to be fed back. As an example for an OFDM system, if the SNR corresponding to a particular spatial subchannel for $N_M$ frequency subchannels is the same, the SNR and the first and last frequency subchannels for which this condition is true may be reported. Other compression and feedback channel error recovery techniques to reduce the amount of data to be fed back for CSI may also be used and are within the scope of the invention.

Referring back to FIG. 1, the CSI (e.g., the channel SNR) determined by RX MIMO processor 156 is provided to a TX data processor 162, which processes the CSI and provides processed data to one or more modulators 154. Modulators 154 further condition the processed data and transmit the CSI back to transmitter system 10 via a reverse channel.

At system 110, the transmitted feedback signal is received by antennas 124, demodulated by demodulators 122, and provided to a RX data processor 132. RX data processor 132 performs processing complementary to that performed by TX data processor 162 and recovers the reported CSI, which is then provided to, and used to adjust the processing by, TX data processor 114 and TX MIMO processor 120.

Transmitter system 110 may adjust (i.e., adapt) its processing based on the CSI (e.g., SNR information) from receiver system 150. For example, the coding for each transmission channel may be adjusted such that the information bit rate matches the transmission capability supported by the channel SNR. Additionally, the modulation scheme for the transmission channel may be selected based on the channel SNR. Other processing (e.g., interleaving) may also be adjusted and are within the scope of the invention. The adjustment of the processing for each transmission channel based on the determined SNR for the channel allows the MIMO system to achieve high performance (i.e., high throughput or bit rate for a particular level of performance). The adaptive processing can be applied to a single-carrier MIMO system or a multi-carrier based MIMO system (e.g., a MIMO system utilizing OFDM).

The adjustment in the coding and/or the selection of the modulation scheme at the transmitter system may be achieved based on numerous techniques, one of which is described in the aforementioned U.S patent application Ser. No. 09/776,073.

MIMO System Operating Schemes

Various operating schemes may be implemented for a MIMO system that employs adaptive transmitter processing (which is dependent on the available CSI) and successive cancellation receiver processing techniques described herein. Some of these operating schemes are described in further detail below.

In one operating scheme, the coding and modulation scheme for each transmission channel is selected based on the channel's transmission capability, as determined by the channel's SNR. This scheme can provide improved performance when used in combination with the successive cancellation receiver processing technique, as described in further detail below. When there is a large disparity between the worst-case and best-case transmission channels (i.e., transmit-receive antenna pairings), the coding may be selected to introduce sufficient redundancy to allow the receiver system to recover the original data stream. For example, the worst transmit antenna may have associated with it a poor SNR at the receiver output. The forward error correction (FEC) code is then selected to be powerful enough to allow the symbols transmitted from the worst-case transmit antenna to be correctly received at the receiver system. In practice, improved error correction capability comes at the price of increased redundancy, which implies a sacrifice in overall throughput. Thus, there is a tradeoff in terms of reduced throughput for increased redundancy using FEC coding.

When the transmitter is provided with the SNR per recovered transmitted signal, a different coding and/or modulation scheme may be used for each transmitted signal. For example, a specific coding and modulation scheme may be selected for each transmitted signal based on its SNR so that the error rates associated with the transmitted signals are approximately equal. In this way, throughput is not dictated by the SNR of the worst-case transmitted signal.

As an example, consider a 4×4 MIMO system with 4 transmit and 4 receive antennas and employing the successive cancellation receiver processing technique described herein. For this example, the SNR for the four transmitted signals are 5 dB, 8.5 dB, 13 dB, and 17.5 dB. If the same coding and modulation scheme is used for all four transmitted signal, the selected scheme would be dictated by the transmitted signal having 5 dB SNR. Using the information given in Table 1, each transmit antenna would employ a coding rate of 3/4 and QPSK modulation, giving a total modulation efficiency of 6 information bits/symbol, or 1.5 information bits/symbol/transmitted signal.

With CSI available, the transmitter may select the following coding and modulation schemes for the four transmitted signals, as shown in Table 2.

TABLE 2

| SNR (dB) | Coding Rate | Modulation Symbol | # of Information Bits/Symbol |
|---|---|---|---|
| 5 | 3/4 | QPSK | 1.5 |
| 8.5 | 5/8 | 16-QAM | 2.5 |
| 13 | 7/12 | 64-QAM | 3.5 |
| 17.5 | 5/6 | 64-QAM | 5 |

By adjusting the coding and modulation scheme at the transmitter based on the available CSI, the effective modulation efficiency achieved is more than doubled to 12.5 bits/symbol versus 6 bits/symbol without CSI. The decoded error rate for each of the transmitted signals will be approximately equal since the coding and modulation scheme was selected to achieve this level of performance.

With adaptive processing at the transmitter system based on the available CSI, the successive cancellation receiver processing technique may be altered to take advantage of the fact that the bit error rates for the transmitted signals are approximately equal. If the coding and modulation scheme used on each transmitted signal provides an equivalent decoded error rate, then the ranking procedure (i.e., highest to lower SNR) may be omitted from the receiver processing, which may simplify the processing. In practical implementation, there may be slight differences in the decoded error rates for the transmitted signals. In this case, the SNR for the transmitted signals (after the linear or non-linear processing) may be ranked and the best post-processed SNR selected for detection (i.e., demodulation and decoding) first, as described above.

With CSI available at the transmitter, throughput is no longer dictated by the worst-case transmitted signal since the coding and modulation schemes are selected to provide a particular level of performance (e.g., a particular BER) on each transmission channel based on the channel's SNR. Since FEC coding is applied to each transmission channel independently, the minimum amount of redundancy required to meet the target level of performance is used, and throughput is maximized. The performance achievable with adaptive transmitter processing based on CSI (e.g., SNR) and successive cancellation receiver processing rivals that of a full-CSI processing scheme (whereby full characterization is available for each transmit-receive antenna pair) under certain operating conditions, as described in further detail below.

In another operating scheme, the transmitter it not provided with the SNR achieved for each transmission channel, but may be provided with a single value indicative of the average SNR for all transmission channels, or possibly some information indicating which transmit antennas to be used for data transmission. In this scheme, the transmitter may employ the same coding and modulation scheme on all transmit antennas used for data transmission, which may be a subset of the NT available transmit antennas. When the same coding and modulation scheme is used on all transmit antennas, performance may be compromised. This is because the overall performance of the successive cancellation receiver processing technique is dependent on the ability to decode each transmitted signal error free. This correct detection is important to effectively cancel the interference due to the recovered transmitted signal.

By using same coding and modulation scheme for all transmitted signals, the recovered transmitted signal with the worst SNR will have the highest decoded error rate. This ultimately limits the performance of the MIMO system since the coding and modulation scheme is selected so that the error rate associated with the worst-case transmitted signal meets the overall error rate requirements. To improve efficiency, additional receive antennas may be used to provide improved error rate performance on the first recovered transmitted signal. By employ more receive antennas than transmit antennas, the error rate performance of the first recovered transmitted signal has a diversity order of ($N_R$−$N_T$+1) and reliability is increased.

In yet another operating scheme, the transmitted data streams are "cycled" across all available transmit antennas. This scheme improves the SNR statistics for each of the recovered transmitted signals since the transmitted data is not subjected to the worst-case transmission channel, but instead is subjected to all transmission channels. The decoder associated with a specific data stream is effectively presented with "soft decisions" that are representative of the average across all possible pairs of transmit-receive antennas. This operating scheme is described in further detail in European Patent Application Serial No. 99302692.1, entitled "WIRELESS COMMUNICATIONS SYSTEM HAVING A SPACE-TIME ARCHITECTURE EMPLOYING MULTI-ELEMENT ANTENNAS AT BOTH THE TRANSMITTER AND RECEIVER," and incorporated herein by reference.

The successive cancellation receiver processing technique allows a MIMO system to utilize the additional dimensionalities created by the use of multiple transmit and receive antennas, which is a main advantage for employing MIMO. Depending on the characteristics of the MIMO channel, a linear spatial equalization technique (e.g., CCMI or MMSE) or a space-time equalization technique (e.g., MMSE-LE, DFE, or MLSE) may be used to process the received signals. The successive cancellation receiver processing technique, when used in combination with the adaptive transmitter processing based on the available CSI, may allow the same number of modulation symbols to be transmitted for each time slot as for a MIMO system utilizing full CSI.

Other linear and non-linear receiver processing techniques may also be used in conjunction with the successive cancellation receiver processing technique and the adaptive transmitter processing technique, and this is within the scope of the invention. Analogously, FIGS. 6A through 6C represent embodiments of three receiver processing technique capable of processing a MIMO transmission and determining the characteristics of the transmission channels (i.e., the SNR). Other receiver designs based on the techniques presented herein and other receiver processing techniques can be contemplated and are within the scope of the invention.

The linear and non-linear receiver processing techniques (e.g., CCMI, MMSE, MMSE-LE, DFE, MLSE, and other techniques) may also be used in a straightforward manner without adaptive processing at the transmitter when only the overall received signal SNR or the attainable overall throughput estimated based on such SNR is feed back. In one implementation, a modulation format is determined based on the received SNR estimate or the estimated throughput, and the same modulation format is used for all transmission channels. This method may reduce the overall system throughput but may also greatly reduce the amount of information sent back over the reverse link.

System Performance

Improvement in system performance may be realized with the use of the successive cancellation receiver processing technique and the adaptive transmitter processing technique based on the available CSI. The system throughput with CSI feedback can be computed and compared against the throughput with full CSI feedback. The system throughput can be defined as:

$$C = \sum_{i=1}^{N_C} \log_2(1 + \gamma_i),  \quad \text{Eq (54)}$$

where $\gamma_i$ is the SNR of each received modulation symbol. The SNR for some of the receiver processing techniques are summarized above.

Figure 9A:
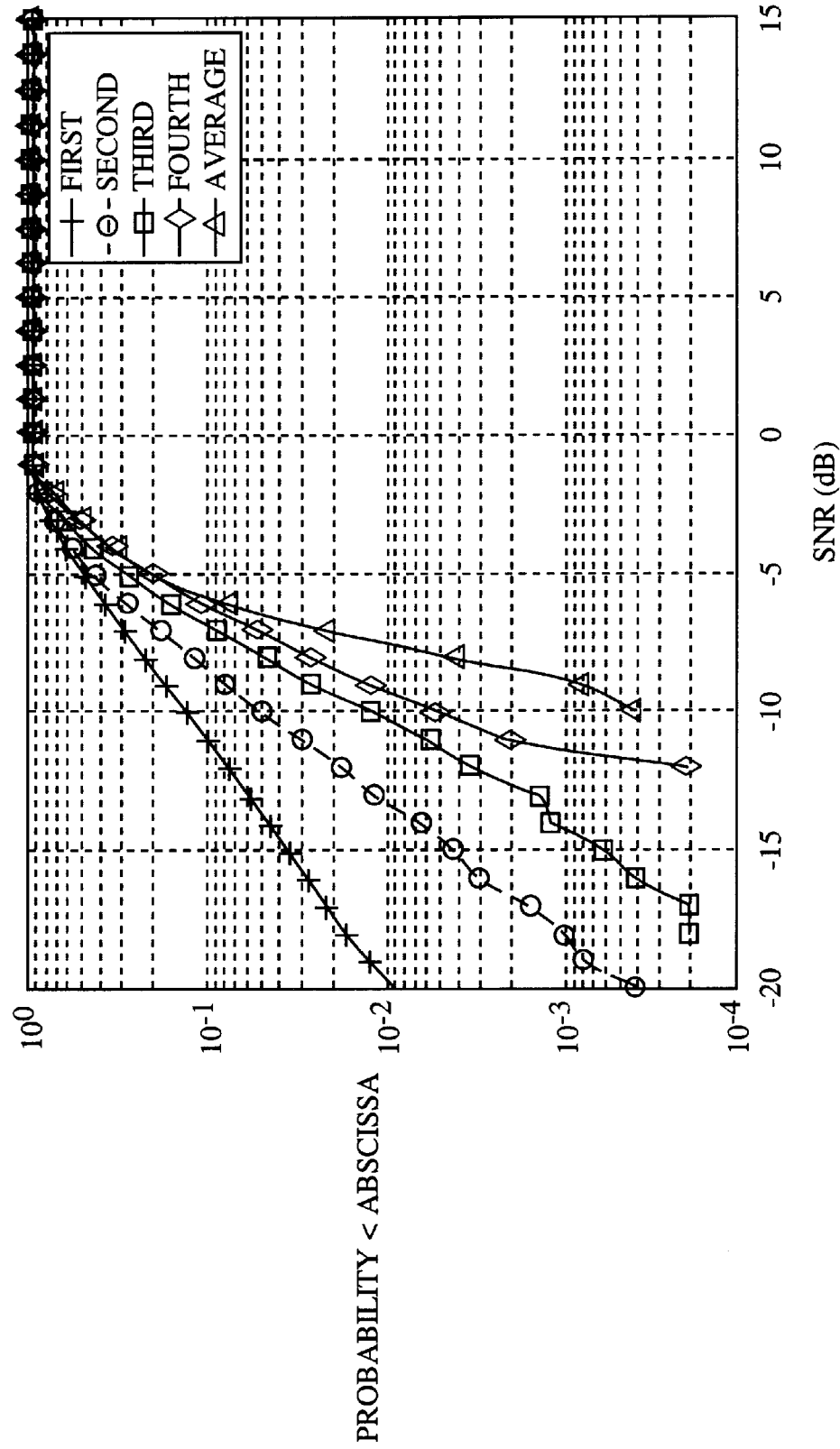

FIG. 9A shows the improvement in SNR for a 4×4 MIMO channel configuration using the successive cancellation receiver processing technique. The results are obtained from a computer simulation. In the simulation, the following assumptions are made: (1) independent Rayleigh fading channels between receiver-transmit antenna pairs (i.e., no array correlation), (2) total interference cancellation (i.e., no decision errors are made in the decoding process and accurate channel estimates are available at the receiver). In practical implementation, channel estimates are not totally accurate, and a back-off factor may be used in the modulation scheme selected for each transmitted data stream. In addition, some decision errors are likely to occur in the detection of each transmitted data stream. This probability can be reduced if independently transmitted data streams are individually coded, which would then allow the receiver to decode the data streams independently, which may then reduce the probability of decision errors. In this case, the decoded data is re-encoded to construct the interference estimate used in the successive interference cancellation.

As shown in FIG. 9A, the first recovered transmitted signal has the poorest SNR distribution. Each subsequent recovered transmitted signal has improved SNR distributions, with the final recovered transmitted signal (i.e., the fourth one in this example) having the best overall SNR distribution. The distribution of the average SNR formed by summing the SNRs for the individual transmitted signals and dividing by four is also shown. The SNR distribution achieved without successive spatial equalization and interference cancellation is given by the SNR distribution for the first recovered transmitted signal. In comparing the SNR distribution for the first recovered transmitted signal to the average SNR distribution, it can be seen that the spatial equalization and interference cancellation technique improves the effective SNR at the receiver.

Figure 9B:
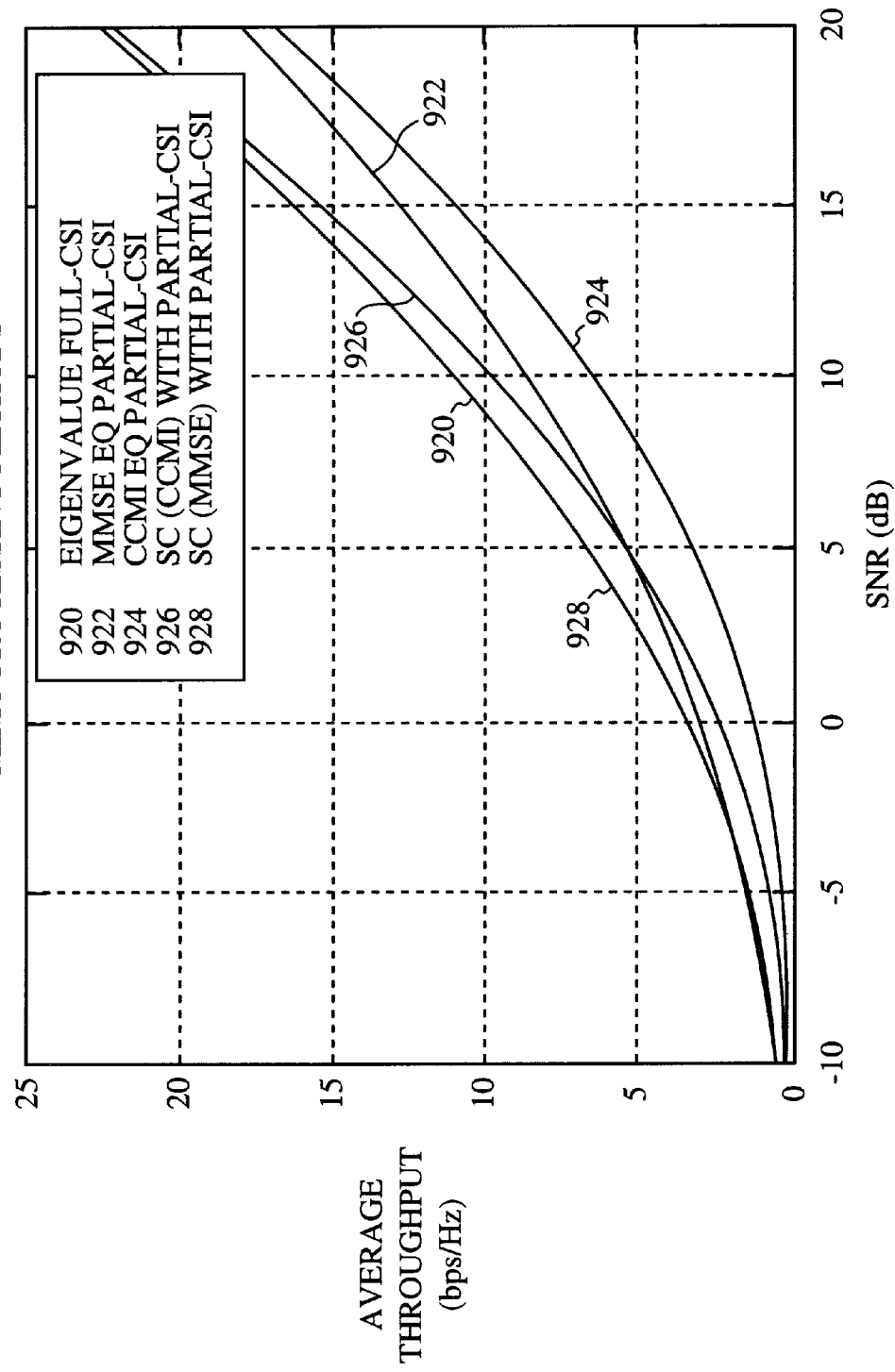

FIG. 9B shows the average throughput for a number of receive processing techniques, including (1) the linear spatial equalization technique (without interference cancellation), (2) the spatial equalization and interference cancellation technique, and (3) the full-CSI technique. For each of these schemes, the transmitter is provided with either full or partial CSI for all transmitted signals, and the data for each transmitted signal is encoded and modulated based on the SNR. For the plots shown in FIG. 9B, the CCMI and MMSE techniques are used for the linear spatial equalization technique.

FIG. 9B shows the theoretical capacity (plot 920) achieved when using full-CSI processing based on the decomposition of the MIMO channel into eigenmodes. FIG. 9B further shows that the throughputs for both the CCMI technique (plot 924) and MMSE technique (plot 922) with partial-CSI but without interference cancellation have lower throughput than the capacity bound (plot 920).

Since capacity is proportional to SNR, as shown in equation (20), and SNR improves with the use of successive interference cancellation, capacity on average improves using the spatial equalization and interference cancellation technique. Using spatial equalization (with CCMI) and interference cancellation technique and partial-CSI, the throughput (plot 926) is improved over the spatial equalization only schemes (plots 922 and 924), with performance improving more as SNR increases. Using spatial equalization (with MMSE) and interference cancellation technique and partial-CSI, the throughput (plot 928) is identical to the capacity bound (plot 920), which represents remarkable system performance. Plot 920 assumes perfect channel estimates and no decision errors. The throughput estimates shown in FIG. 9B for the successive spatial equalization and interference cancellation technique with partial-CSI processing may degrade under practical implementations due to imperfect interference cancellation and detection errors.

FIG. 9C shows the average throughput for the successive space-time equalization (with MMSE-LE) and interference cancellation technique with adaptive transmitter processing based on CSI for a 4×4 MIMO system. The plots are obtained by averaging over a large number of static realizations of a dispersive channel model (i.e., VehA). FIG. 9C shows the capacity bound (plot 930) and the performance of the MMSE-LE technique with interference cancellation (plot 934) and without successive interference cancellation (plot 932). The throughput performance for the MMSE-LE without successive interference cancellation technique (plot 932) degrades at higher SNR values. The throughput performance for the MMSE-LE with successive interference cancellation technique (plot 934) is close to channel capacity, which represents a high level of performance.

The elements of the transmitter and receiver systems may be implemented with one or more digital signal processors (DSP), application specific integrated circuits (ASIC), processors, microprocessors, controllers, microcontrollers, field programmable gate arrays (FPGA), programmable logic devices, other electronic units, or any combination thereof. Some of the functions and processing described herein may also be implemented with software executed on a processor.

Certain aspects of the invention may be implemented with a combination of software and hardware. For example, computations for the symbol estimates for the linear spatial equalization, the space-time equalization, and the derivation of the channel SNR may be performed based on program codes executed on a processor (controllers 540 in FIG. 5).

For clarity, the receiver architecture shown in FIG. 5 includes a number of receiving processing stages, one stage for each data stream to be decoded. In some implementations, these multiple stages may be implemented with a single hardware unit or a single software module that is re-executed for each stage. In this manner, the hardware or software may be time shared to simplify the receiver design.

Headings are included herein for reference and to aid in the locating certain sections. These heading are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for processing data at a receiver unit in a multiple-input multiple-output (MIMO) communication system, comprising:

processing a plurality of input signals having included therein one or more symbol streams corresponding to one or more data streams to provide a decoded data stream for one of the one or more symbol streams;

deriving a plurality of modified signals based on the input signals and having components due to the decoded data stream approximately removed;

performing the processing and selectively performing the deriving for each of one or more iterations, one iteration for each data stream to be decoded, and wherein the input signals for each iteration subsequent to a first iteration are the modified signals from a preceding iteration; and determining channel state information (CSI) indicative of characteristics of a MIMO channel used for transmitting the data steams, wherein the data streams are adaptively processed at a transmitter unit based in part on the CSI.

2. The method of claim 1, wherein the deriving is omitted for a last iteration.

3. The method of claim 1, wherein the processing includes processing the input signals in accordance with a particular receive processing scheme to provide the one or more symbol streams, and processing a selected one of the one or more symbol streams to provide the decoded data stream.

4. The method of claim 3, further comprising:

for each iteration, estimating a quality of each of one or more unprocessed symbol streams included in the input signals; and selecting one unprocessed symbol stream for processing based on estimated qualities for the one or more unprocessed symbol streams.

5. The method of claim 4, wherein the quality of each unprocessed symbol stream is estimated based on a signal-to-noise-plus-interference-ratio (SNR).

6. The method of claim 4, wherein the unprocessed symbol stream having the best estimated quality is selected for processing.

7. The method of claim 3, wherein the receive processing scheme performs linear spatial processing on the input signals.

8. The method of claim 7, wherein the receive processing scheme implements a channel correlation matrix inversion (CCMI) technique.

9. The method of claim 7, wherein the receive processing scheme implements a minimum mean square error (MMSE) technique.

10. The method of claim 7, wherein the receive processing scheme implements a full-CSI processing technique.

11. The method of claim 3, wherein the receive processing scheme performs space-time processing on the input signals.

12. The method of claim 11, wherein the receive processing scheme implements a minimum mean-square error linear space-time equalizer (MMSE-LE).

13. The method of claim 11, wherein the receive processing scheme implements a decision feedback space-time equalizer (DFE).

14. The method of claim 11, wherein the receive processing scheme implements a maximum-likelihood sequence estimator (MLSE).

15. The method of claim 1, wherein the deriving includes
generating a remodulated symbol stream based on the decoded data stream;
forming a plurality of interference signals based on the remodulated symbol stream; and
removing the interference signals from the input signals to derive the modified signals that serve as input signals for a succeeding iteration.

16. The method of claim 15, wherein the interference signals are formed based on a channel coefficient matrix $\underline{H}$ indicative of characteristics of the MIMO channel.

17. The method of claim 1, further comprising:
transmitting the CSI from the receiver unit to the transmitter unit.

18. The method of claim 1, wherein the CSI comprises signal-to-noise-plus-interference-ratio (SNR) estimates for each of one or more transmission channels that compose the MIMO channel.

19. The method of claim 1, wherein the CSI comprises characterizations for one or more transmission channels that compose the MIMO channel.

20. The method of claim 1, wherein the CSI comprises an indication of a particular data rate supported by each of one or more transmission channels used for data transmission.

21. The method of claim 1, wherein the CSI comprises an indication of a particular processing scheme to be used for each of one or more transmission channels.

22. The method of claim 1, wherein the CSI comprises signal measurements and noise plus interference measurements for one or more transmission channels.

23. The method of claim 1, wherein the CSI comprises signal measurements, noise measurements, and interference measurements for one or more transmission channels.

24. The method of claim 1, wherein the CSI comprises signal to noise ratio and interference measurements for one or more transmission channels.

25. The method of claim 1, wherein the CSI comprises signal components and noise plus interference components for one or more transmission channels.

26. The method of claim 1, wherein the CSI comprises indications of changes in the characteristics of one or more transmission channels.

27. The method of claim 1, wherein the CSI is determined at the receiver unit and reported to the transmitter unit.

28. The method of claim 1, wherein the CSI is determined at the transmitter unit based on one or more signals transmitted by the receiver unit.

29. The method of claim 1, wherein each data stream is coded at the transmitter unit in accordance with a coding scheme selected based on the CSI for the transmission channel used to transmit the data stream.

30. The method of claim 29, wherein each data stream is independently coded in accordance with a coding scheme selected based on the CSI for the transmission channel used to transmit the data stream.

31. The method of claim 29, wherein each data stream is further modulated in accordance with a modulation scheme selected based on the CSI for the transmission channel used to transmit the data stream.

32. The method of claim 31, wherein the coding and modulation schemes are selected at the transmitter unit based on the CSI.

33. The method of claim 32, wherein the coding and modulation schemes are indicated by the CSI.

34. The method of claim 3, wherein the processing of the selected symbol stream includes
demodulating the symbol stream to provide demodulated symbols, and
decoding the demodulated symbols to provide the decoded data stream.

35. The method of claim 34, wherein the processing of the selected symbol stream further includes
deinterleaving the demodulated symbols, wherein the decoding is performed on the deinterleaved symbols to provide the decoded data stream.

36. The method of claim 1, wherein the MIMO system implements orthogonal frequency division modulation (OFDM).

37. The method of claim 36, wherein the processing at the receiver unit is independently performed for each of a plurality of frequency subchannels.

38. A method for processing data at a receiver unit in a multiple-input multiple-output (MIMO) communication system, comprising:
receiving a plurality of signals via a plurality of received antennas;
processing the received signals in accordance with a particular receive processing scheme to provide a plurality of symbol streams corresponding to a plurality of transmitted data streams;
processing a selected one of the symbol streams to provide a decoded data stream;
forming a plurality of interference signals based on the decoded data stream;
deriving a plurality of modified signals based on the received signals and the interference signals;
performing the processing of the received signals and the selected symbol stream and selectively performing the forming and deriving for one or more iterations, one iteration each transmitted data stream to be decoded, wherein a first iteration is performed on the received signals and each subsequent iteration is performed on the modified signals from a preceding iteration; and determining channel state information (CSI) indicative of characteristics of a MIMO channel used for transmitting the data steams, wherein the data streams are adaptively processed at a transmitter unit based in part on the CSI.

39. A method for communicating data from a transmitter unit to a receiver unit in a multiple-input multiple-output (MIMO) communication system, comprising:

at the receiver unit,
  receiving a plurality of signals via a plurality of receive antennas, wherein each received signal comprises a combination of one or more signals transmitted from the transmitter unit,
  processing the received signals in accordance with a successive cancellation receiver processing technique to provide a plurality of decoded data streams transmitted from the transmitter unit,
  determining channel state information (CSI) indicative of characteristics of a MIMO channel used to transmit the data steams, and
  transmitting the CSI back to the transmitter unit; and at the transmitter unit,
  adaptively processing each data stream prior to transmission over the MIMO channel in accordance with the received CSI.

40. The method of claim 39, wherein the successive cancellation receiver processing scheme performs a plurality of iterations to provide the decoded data streams, one iteration for each decoded data stream.

41. The method of claim 40, wherein each iteration includes
  processing a plurality of input signals in accordance with a particular linear or non-linear processing scheme to provide one or more symbol streams,
  processing a selected one of the one or more symbol streams to provide a decoded data stream, and
  deriving a plurality of modified signals based on the input signals and having components due to the decoded data stream approximately removed, wherein the input signals for a first iteration are the received signals and the input signals for each subsequent iteration are the modified signals from a preceding iteration.

42. The method of claim 39, wherein the CSI comprises a signal-to-noise-plus-interference-ratio (SNR) for each of one or more transmission channels that compose the MIMO channel.

43. The method of claim 39, wherein the CSI comprises an indication of a particular data rate supported by each of one or more transmission channels that compose the MIMO channel.

44. The method of claim 39, wherein the CSI comprises an indication of a particular processing scheme to be used for each of one or more transmission channels that compose the MIMO channel.

45. The method of claim 39, wherein the adaptive processing at the transmitter unit includes
  encoding a data stream in accordance with a particular coding scheme selected based on the CSI associated with the data stream.

46. The method of claim 45, wherein the adaptive processing at the transmitter unit further includes
  modulating the encoded data stream in accordance with a particular modulation scheme selected based on the CSI associated with the data stream.

47. A multiple-input multiple-output (MIMO) communication system, comprising:

a receiver unit comprising
  a plurality of front-end processors configured to process a plurality of received signals to provide a plurality of symbol streams,
  at least one receive processor coupled to the front-end processors and configured to process the symbol streams in accordance with a successive cancellation receiver processing scheme to provide a plurality of decoded data streams, and to further derive channel state information (CSI) indicative of characteristics of a MIMO channel used to transmit the data streams, and
  a transmit data processor operatively coupled to the receive processor and configured to process the CSI for transmission back to the transmitter unit; and a transmitter unit comprising
  at least one demodulator configured to receive and process one or more signals from the receiver unit to recover the transmitted CSI, and
  a transmit data processor configured to adaptively process data for transmission to the receiver unit based on the recovered CSI.

48. A receiver unit in a multiple-input multiple-output (MIMO) communication system, comprising:

a plurality of front-end processors configured to process a plurality of received signals to provide a plurality of received symbol streams;

at least one receive processor coupled to the front-end processors and configured to process the received symbol streams to provide a plurality of decoded data streams, each receive processor including a plurality of processing stages, each stage configured to process input symbol streams to provide a respective decoded data stream and channel state information (CSI) associated with the decoded data stream, and to selectively provide modified symbol streams for a succeeding stage, wherein the input symbol streams for each stage are either the received symbol streams or the modified symbol streams from a preceding stage; and a transmit processor configured to receive and process the CSI associated with the decoded data streams for transmission from the receiver unit, wherein the data streams are adaptively processed prior to transmission based in part on the CSI.

49. The receiver unit of claim 48, wherein each processing stage except a last stage includes
  a channel processor configured to process the input symbol streams to provide a decoded data stream, and
  an interference canceller configured to derive the modified symbol streams based on the decoded data stream and the input symbol streams.

50. The receiver unit of claim 49, wherein each channel processor includes
  an input processor configured to process the input symbol streams to provide a recovered symbol stream, and
  a data processor configured to process the recovered symbol stream to provide the decoded data stream.

51. The receiver unit of claim 50, wherein each input processor includes
  a first processor configured to process the input symbol streams in accordance with a linear or non-linear receive processing scheme to provide the recovered symbol stream, and
  a channel quality estimator configured to estimate a quality of the recovered symbol stream.

52. The receiver unit of claim 51, wherein the estimated quality comprises a signal-to-noise-plus-interference-ratio (SNR).

53. The receiver unit of claim 51, wherein the channel quality estimator is further configured to provide an indication of a data rate supported for the recovered symbol stream based on the quality estimate.

54. The receiver unit of claim 51, wherein the channel quality estimator is further configured to provide an indication of a particular processing scheme to be used at a transmitter unit for the recovered symbol stream based on the quality estimate.

55. The receiver unit of claim 51, wherein the estimated quality comprises an error signal indicative of detected noise plus interference level at the output of the receiver unit.

56. The receiver unit of claim 51, wherein the first processor performs linear spatial processing on the input symbol streams.

57. The receiver unit of claim 51, wherein the first processor performs space-time processing on the input symbol streams.

* * * * *